(12) United States Patent
Nicholson et al.

(10) Patent No.: US 11,969,928 B2
(45) Date of Patent: Apr. 30, 2024

(54) METHOD OF MANUFACTURING FOOD PACKAGING PLASTIC FILMS AND FOOD PACKAGING PLASTIC FILMS THUS PRODUCED

(71) Applicant: Viskase Companies, Inc., Lombard, IL (US)

(72) Inventors: Myron D. Nicholson, Lombard, IL (US); Francois Bargeot, Lombard, IL (US)

(73) Assignee: VISKASE COMPANIES, INC., Lombard, IL (US)

( * ) Notice: Subject to any disclaimer, the term of this patent is extended or adjusted under 35 U.S.C. 154(b) by 546 days.

(21) Appl. No.: 16/339,259

(22) PCT Filed: Oct. 3, 2016

(86) PCT No.: PCT/US2016/055166
§ 371 (c)(1),
(2) Date: Apr. 3, 2019

(87) PCT Pub. No.: WO2018/067111
PCT Pub. Date: Apr. 12, 2018

(65) Prior Publication Data
US 2020/0047385 A1  Feb. 13, 2020

(51) Int. Cl.
*B29B 7/90* (2006.01)
*A22C 13/02* (2006.01)
(Continued)

(52) U.S. Cl.
CPC ............ *B29C 48/022* (2019.02); *A22C 13/02* (2013.01); *B29B 7/90* (2013.01); *B29C 48/21* (2019.02);
(Continued)

(58) Field of Classification Search
CPC .... A22C 2013/0059; A22C 2013/0063; A22C 2013/0053; A22C 2013/0073;
(Continued)

(56) References Cited

U.S. PATENT DOCUMENTS 2,179,181 A   11/1939  Charles et al.
2,949,371 A   8/1960   Freund et al.
(Continued)

FOREIGN PATENT DOCUMENTS

DE   100 08 473    *  8/2001  ............ B32B 27/34
DE   10305580 A1      8/2004
(Continued)

OTHER PUBLICATIONS

Trantidou, T., Elani, Y., Parsons, E. et al. "Hydrophilic surface modification of PDMS for droplet microfluidics using a simple, quick, and robust method via PVA deposition." Microsyst Nanoeng 3, 16091 (2017). https://doi.org/10.1038/micronano.2016.91 (Year: 2017).*

(Continued)

*Primary Examiner* — Michael C Romanowski
(74) *Attorney, Agent, or Firm* — TraskBritt

(57) ABSTRACT

The present invention relates to a method of manufacturing a plastic film (i.e. preferably a thermoplastic film), particularly a (thermo)plastic food packing film, especially a detectable (thermo)plastic film, which plastic film comprises detectable particles incorporated therein, as well as to the plastic film thus produced and to its applications and usages (i.e. its use).

23 Claims, 3 Drawing Sheets

(51) Int. Cl.

| | | |
|---|---|---|
| B29C 48/00 | (2019.01) | |
| B29C 48/21 | (2019.01) | |
| B32B 1/02 | (2006.01) | |
| B32B 1/08 | (2006.01) | |
| B32B 7/12 | (2006.01) | |
| B32B 27/08 | (2006.01) | |
| B32B 27/18 | (2006.01) | |
| B32B 27/22 | (2006.01) | |
| B32B 27/32 | (2006.01) | |
| B32B 27/34 | (2006.01) | |
| B32B 37/15 | (2006.01) | |
| B65D 65/40 | (2006.01) | |
| C08J 3/20 | (2006.01) | |
| C08J 5/18 | (2006.01) | |
| C08K 3/22 | (2006.01) | |
| C08K 9/06 | (2006.01) | |
| G01V 15/00 | (2006.01) | |
| A22C 13/00 | (2006.01) | |
| B29K 77/00 | (2006.01) | |
| B29K 509/02 | (2006.01) | |
| B29L 31/00 | (2006.01) | |

(52) U.S. Cl.
CPC ............... *B32B 1/02* (2013.01); *B32B 1/08* (2013.01); *B32B 7/12* (2013.01); *B32B 27/08* (2013.01); *B32B 27/18* (2013.01); *B32B 27/22* (2013.01); *B32B 27/32* (2013.01); *B32B 27/34* (2013.01); *B32B 37/153* (2013.01); *B65D 65/40* (2013.01); *C08J 3/201* (2013.01); *C08J 5/18* (2013.01); *C08K 3/22* (2013.01); *C08K 9/06* (2013.01); *G01V 15/00* (2013.01); *A22C 13/0013* (2013.01); *A22C 2013/0059* (2013.01); *A22C 2013/0073* (2013.01); *B29K 2023/06* (2013.01); *B29K 2077/00* (2013.01); *B29K 2509/02* (2013.01); *B29K 2995/0008* (2013.01); *B29L 2031/712* (2013.01); *B32B 2264/102* (2013.01); *B32B 2307/208* (2013.01); *B32B 2439/70* (2013.01); *B32B 2553/00* (2013.01); *C08J 2323/06* (2013.01); *C08K 2003/2265* (2013.01); *C08K 2003/2268* (2013.01); *C08K 2003/2272* (2013.01); *C08K 2003/2275* (2013.01); *C08K 2201/005* (2013.01); *C08K 2201/01* (2013.01)

(58) Field of Classification Search
CPC ........ A22C 2013/0086; B29K 2023/06; B29K 2077/00; B29K 2509/02; B29K 2995/0003; B29K 2995/0008; B32B 1/08; B32B 27/18; B32B 27/20; B32B 27/22; B32B 27/32; B32B 27/34; B32B 2439/70; B32B 2307/20; B32B 2307/208; B32B 2264/102; B32B 2264/501; B32B 2264/1056; C08K 2003/2265–2275; C08J 5/18
USPC ...................... 428/34.8, 34.9, 35.2
See application file for complete search history.

(56) References Cited

U.S. PATENT DOCUMENTS

| | | | | |
|---|---|---|---|---|
| 3,334,168 | A | | 8/1967 | Henry et al. |
| 3,886,979 | A | * | 6/1975 | Rasmussen ........ A22C 13/0013 138/118.1 |
| 4,145,532 | A | | 3/1979 | Franks et al. |
| 4,377,187 | A | | 3/1983 | Chiu |
| 4,619,859 | A | * | 10/1986 | Yoshimura ............. B32B 27/32 428/213 |
| 4,731,400 | A | * | 3/1988 | Shigemoto ............... C08K 3/04 524/88 |
| 4,756,914 | A | | 7/1988 | Jon et al. |
| 5,023,159 | A | * | 6/1991 | Ong .................... G03G 9/08791 430/110.2 |
| 5,051,034 | A | * | 9/1991 | Goodman .............. G02B 6/562 138/104 |
| 5,277,857 | A | | 1/1994 | Nicholson et al. |
| 5,549,943 | A | * | 8/1996 | Vicik ..................... B32B 27/32 264/209.6 |
| 5,648,013 | A | * | 7/1997 | Uchida .................... C08L 67/00 524/431 |
| 5,863,643 | A | * | 1/1999 | von Widdern .......... B32B 27/08 428/476.3 |
| 5,922,482 | A | * | 7/1999 | De Ricci ............ G08B 13/2408 2/167 |
| 6,171,668 | B1 | | 1/2001 | Ocheltree et al. |
| 6,177,113 | B1 | | 1/2001 | Kress et al. |
| 6,541,087 | B1 | * | 4/2003 | Pophusen ................. B32B 1/08 428/34.8 |
| 6,547,999 | B1 | | 4/2003 | Ducharme et al. |
| 7,122,593 | B2 | * | 10/2006 | Lucas .................... G01V 15/00 524/407 |
| 7,635,733 | B2 | * | 12/2009 | Lucas ................ A41D 19/0055 524/451 |
| 2003/0091764 | A1 | * | 5/2003 | Fujii ........................ C08K 9/06 428/447 |
| 2004/0224174 | A1 | | 11/2004 | Shoop et al. |
| 2004/0228952 | A1 | | 11/2004 | Krallmann et al. |
| 2005/0106294 | A1 | * | 5/2005 | Stalberg ............. A22C 13/0013 426/135 |
| 2006/0093715 | A1 | | 5/2006 | Weidinger |
| 2006/0094818 | A1 | * | 5/2006 | Weidinger .............. C08L 83/04 524/588 |
| 2007/0205529 | A1 | * | 9/2007 | May ......................... B03C 1/22 264/173.16 |
| 2008/0145576 | A1 | * | 6/2008 | Koenig ............... A22C 13/0013 428/34.8 |
| 2009/0000250 | A1 | | 1/2009 | Nilsson et al. |
| 2010/0116010 | A1 | * | 5/2010 | Fechner ................. D21H 21/28 524/92 |
| 2010/0127207 | A1 | * | 5/2010 | Deetz ..................... B32B 27/20 252/62.51 R |
| 2012/0228182 | A1 | | 9/2012 | Ting et al. |
| 2013/0130000 | A1 | * | 5/2013 | Deetz ..................... B32B 27/08 428/215 |
| 2015/0083809 | A1 | | 3/2015 | Wielockx et al. |
| 2015/0183965 | A1 | * | 7/2015 | Stucchi .................. B29D 29/06 264/405 |
| 2015/0328861 | A1 | | 11/2015 | Koopmans et al. |
| 2019/0040226 | A1 | * | 2/2019 | Aga ....................... C08L 101/00 |
| 2019/0135653 | A1 | * | 5/2019 | Aga .................... C01G 49/0072 |

FOREIGN PATENT DOCUMENTS

| | | | |
|---|---|---|---|
| DE | 202004007735 U1 | 3/2005 | |
| DE | 202005021317 U1 | 11/2007 | |
| EP | 0692194 A1 | 1/1996 | |
| EP | 0577790 B1 | 1/1997 | |
| EP | 1840168 A1 | 10/2007 | |
| EP | 1892092 A1 | 2/2008 | |
| EP | 2796048 A1 | 10/2014 | |
| GB | 2452086 A | 2/2009 | |
| JP | 2002-020554 A | 1/2002 | |
| WO | 93/13670 A1 | 7/1993 | |
| WO | WO-0023275 A1 * | 4/2000 | ............ B32B 27/08 |
| WO | 2006/042724 A2 | 4/2006 | |
| WO | 2007/012898 A1 | 2/2007 | |
| WO | WO 2007012898 * | 2/2007 | ............ B32B 27/32 |
| WO | 2011/123056 A1 | 10/2011 | |
| WO | 2018/067110 A1 | 4/2018 | |
| WO | 2018/067111 A1 | 4/2018 | |

OTHER PUBLICATIONS

Daoush, Walid M. "Co-Precipitation and Magnetic Properties of Magnetite Nanoparticles for Potential Biodmedical Applications."

(56) References Cited

OTHER PUBLICATIONS

Journal of Nanomedicine Research, vol. 5, No. 3, 2017, doi: 10.15406/jnmr.2017.05.00118 (Year: 2017).*
Park et al., Hydrophobic Polydimethylsiloxane (PDMS) Coating of Mesoporous Silica and Its Use as a Preconcentrating Agent of Gas Analytes, Langmuir, 2014, vol. 30, p. 10256-10262, dx.doi.org/10.1021/la502915r (Year: 2014).*
Cornell, Rochelle M., and Udo Schwertmann. The Iron Oxides Structure, Properties, Reactions, Occurrences and Uses, 2nd Edition, Wiley-VCH, Weinheim, 2003, p. 123.) (Year: 2003).*
S. Sheng-Nan et al. "Magnetic iron oxide nanoparticles: synthesis and surface coating techniques for biomedical applications", Chin. Phys. B, vol. 23, No. 3 (2014), 037503-1 to 037503-19.
M. D. Nicholson "Flexible non-woven composites for food packaging", Tappi Journal, vol. 74, No. 5, May 1991, pp. 227 to 231.
International Written Opinion for International Application No. PCT/US2016/055166, dated Jun. 19, 2017, 8 pages.
International Search Report for International Application No. PCT/US2016/055166, dated Jun. 19, 2017, 5 pages.
Database WPI 00246 Thomson Scientific, London, GB; 19, AN 2002-429475 XP002770788 (2017).
A. Durdureanu-Angheluta et al. "Tailored and Functionalized Magnetite Particles for Biomedical and Industrial Applications", www.intechopen.com, pp. 149 to 178 (http://cdn.intechopen.com/pdfs/30356/InTech-Tailored_and_functionalized_magnetite_particles_for_biomedical_and_industrial_applications.pdf), Mar. 7, 2012.

* cited by examiner

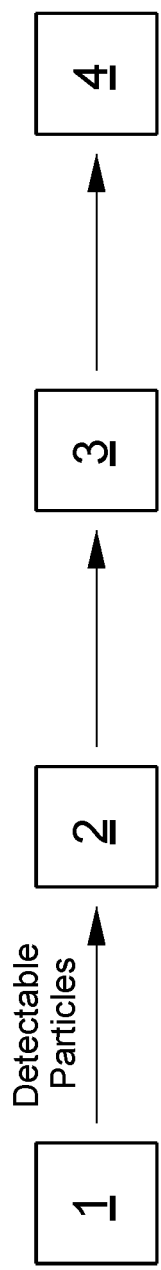

METHOD OF MANUFACTURING FOOD PACKAGING PLASTIC FILMS AND FOOD PACKAGING PLASTIC FILMS THUS PRODUCED

CROSS-REFERENCE TO RELATED APPLICATION

This application is a national phase entry under 35 U.S.C. § 371 of International Patent Application PCT/US2016/055166, filed Oct. 3, 2016, designating the United States of America and published in English as International Patent Publication WO 2018/067111 A1 on Apr. 12, 2018.

TECHNICAL FIELD

The present invention relates to the technical field of food packaging films, especially artificial food packaging films on the basis of plastic materials, particularly thermoplastic materials.

Especially, the present invention relates to a method of manufacturing a plastic film (i.e. an artificial film made of a plastic material), particularly a plastic food packaging film, especially a detectable plastic film, which plastic film comprises detectable particles incorporated therein, and to the film thus obtained as well as to its respective applications and usages (i.e. its use).

Furthermore, the present invention relates to a foodstuff article packaged in a plastic film of the present invention.

Moreover, the present invention also relates to a medical device or article or a pharmaceutical packaged in a plastic film of the present invention.

Further, the present invention is also directed to a method of providing a plastic food packaging film with detection properties and/or detectability.

Also, the present invention relates to the use of detectable particles for providing a plastic food packaging film with detection properties and/or detectability.

Finally, the present invention relates to detectable multilayer films.

BACKGROUND

Films, especially artificial films including plastic (i.e. thermoplastic) films and also cellulosic films, particularly tubular films, are often used as food packaging and/or processing films, e.g. as sausage casings for processing and packaging sausages, including water or steam cooked sausages. Such films, especially in the form of casings or tubes, are also used to process and/or to package larger products, such as various types of deli cold cuts of meats e.g. made from chicken, beef and ham. Furthermore, artificial films including plastic (i.e. thermoplastic) films and also cellulosic films, especially in the form of bags, are also used for storing larger amounts of food ingredients to be further processed within a food production line (e.g. food powders, spices, extracts etc.).

One particularly typical food packaging film, especially casing, used in this respect is made from regenerated cellulose, mostly produced according to the so-called viscose process, which is well known in the art.

Other types of a typical food packaging film are made of a plastic material. For instance, food packaging casings may be made from plastic (i.e. thermoplastic) films or tubes and may either be monolayered or multilayered. Thermoplastic films and casings are advantageous over cellulosic casings primarily for ease of production and lower costs to produce them. Production of thermoplastic films generally involves the melting of a respective plastic (i.e. thermoplastic) resin (such as e.g. a polyamide, a polyolefin etc.) and extruding it, usually through an appropriate die, to form a particular shape, and then heating, cooling and optionally stretching or orienting it during its formation into a film or a tube. No complex chemical process is required unlike in the case of cellulosic food packaging films and casings.

In many applications, such films or casings are applied for intermediate use only (e.g. during processing and/or production of the respective foodstuff), i.e. the films are not part of the final product which is determined for the end-user or the final customer.

Therefore, in these cases where such films are applied for intermediate use only, it is important to ensure that, in the final product, the film has been completely removed from the foodstuff and that no remaining parts of the film are to be found in the final product, which has been processed at least partially within a film (e.g. a casing or tube) beforehand.

In many countries, current food legislation requires the detectability of foreign objects in foodstuff, such as e.g. metal parts (e.g. originating from machine parts used in the food production). Such foreign objects, especially foreign objects of metal, can then be detected by metal detectors positioned in the production line of such foodstuff.

In this respect, DE 103 05 580 A1 and its U.S. equivalent US 2004/0228952 A1 disclose a tubular artificial sausage casing closed at one or two ends by a yarn having a metal insert, which yarn is thus detectable. When processing the sausages within these casings, it is ensured that parts of the closure yarn which might occasionally pass into the sausages due to failures in the production line can be easily detected via metal detectors. However, it is still disadvantageous that the sausage casings as such do not comprise any metal insert and are thus not detectable, so that occasional leftover pieces of casing remaining at the foodstuff surface or inside the foodstuff cannot be detected during processing or production of the foodstuff.

Furthermore, DE 20 2004 007 735 UI (comparable to DE 103 05 580 A1) discloses a sausage casing tied with a yarn, wherein the yarn is made of fibers of a synthetic or natural material, into which metal filaments have been incorporated, so that the yarn used for closing the sausage casing is detectable, but not the casing as such.

Moreover, US 2015/0083809 A1 relates to an artificial food casing comprising a marking with a traceability code, wherein the marking comprises an ultraviolet-detectable component, especially on the inside or outside surface of the film. The ultraviolet-detectable component may be a pigment, a dye, an ink, a chemical compound or a fluorophore. However, the food casing comprising the UV-detectable component may only be detected during food processing or production if it is optically visible, i.e. if it is positioned at the outer side of the foodstuff surface. However, if e.g. pieces of the food casing, during processing or production, are incorporated into the inside of the foodstuff, such pieces of food casing are no longer detectable. Furthermore, UV-detection requires an additional and cost-intensive equipment for detection since in most foodstuff processing or production lines only metal detectors are used for the purpose of detection of metal parts, especially originating from machine parts.

Further, it is also known from the prior art to produce a laminar plastic film for use in food packaging and processing, which film comprises outer sheets of a plastic material (e.g. polyolefin material) and a core layer made of a metal sheet (e.g. aluminum), so as to obtain a three-layered film which might be detected by a metal detector. However, due to the presence of a metallic intermediate core layer disposed between the two outer layers of plastic material, the film as a whole loses the advantageous properties of a plastic film, especially processability, stretchability, mechanical resistance and the like.

Thus, in the prior art, there do not exist food packaging films which unify the advantageous properties of artificial food packaging films, on the one hand, and an efficient detectability of the whole films as such, especially via economic and easily available equipment, on the other hand.

What is needed in the packaging industry, especially food packaging industry, is therefore a packaging film on the basis of a plastic material (preferably a thermoplastic material), especially a plastic (i.e. thermoplastic) food packaging film, which film is detectable or is provided with detection properties and/or detectability, especially with detection properties and/or detectability via a metal detection device (e.g. a metal detector) and/or via an induction-based and/or magnetism-based and/or conductivity-based detection device and/or via an optically based device and/or via a photodetection device.

Particularly, in view of the prior art described before, the problem underlying the present invention is especially to provide a detectable plastic-based packaging film, especially a detectable plastic (preferably thermoplastic) food packaging film, as well as a respective manufacturing method thereof, wherein the above-described disadvantages of the prior art are to be ameliorated or at least substantially avoided, respectively.

Especially, one particular problem addressed by the present invention is that of providing a detectable plastic (and preferably thermoplastic) film, especially to be used as a food packaging film, which film is to unify the advantageous properties of (thermo)plastic films, such as e.g. tear and tensile strength, flavor sealing properties, transparency, oxygen and/or water vapor barrier properties etc., on the one hand, and an efficient detectability of the whole film as such, especially via economic and easily available equipment, on the other hand.

Particularly, such detectable (thermo)plastic film, especially detectable (thermo)plastic food packaging film, is to be detectable also in industrial and/or automated packaging and/or processing and/or production processes (such as e.g. food packaging and/or food processing and/or food production).

BRIEF SUMMARY

The present invention, according to a first aspect of the present invention, refers to a method of manufacturing a plastic film (i.e. preferably thermoplastic film), particularly a (thermo)plastic food packaging film, especially a detectable (thermo)plastic film, which plastic film comprises detectable particles incorporated therein. Further, particularly advantageous embodiments of this aspect of the present invention are described herein.

Furthermore, according to a second aspect of the present invention, the present invention also relates to a plastic film (i.e, preferably thermoplastic film), particularly a (thermo)plastic food packaging film, especially a detectable (thermo)plastic film, which plastic film comprises detectable particles incorporated therein, particularly in homogeneous distribution. Further, particularly advantageous embodiments of this aspect of the present invention are described herein.

Further, according to a third aspect of the present invention, the present invention also relates to the inventive use of the plastic film of the present invention for packaging and/or processing and/or producing foodstuff. Further, particularly advantageous embodiments of this aspect of the present invention are described herein.

Also, according to a fourth aspect of the present invention, the present invention further relates to the inventive use of the plastic film of the present invention for enhancing and/or improving food safety and/or food security, especially in packaging and/or processing and/or producing. Further, particularly advantageous embodiments of this aspect of the present invention are described herein.

Furthermore, according to a fifth aspect of the present invention, the present invention also relates to the inventive use of the plastic film of the present invention for detecting undesired residues or remainders of the plastic film on foodstuff surfaces and/or within or inside foodstuff. Further, particularly advantageous embodiments of this aspect of the present invention are described herein.

Further, according to a sixth aspect of the present invention, the present invention also relates to the inventive use of the plastic film of the present invention for detecting undesired residues or remainders of the plastic film in industrial and/or automated packaging and/or processing and/or production processes. Further, particularly advantageous embodiments of this aspect of the present invention are described herein.

Moreover, according to a seventh aspect of the present invention, the present invention also relates to the inventive use of the plastic film of the present invention for packaging and/or processing and/or producing medical devices and articles or pharmaceuticals. Further, particularly advantageous embodiments of this aspect of the present invention are described herein.

Furthermore, according to an eighth aspect of the present invention, the present invention also relates to the inventive use of the plastic film of the present invention for enhancing and/or improving safety and/or security in packaging and/or processing and/or producing medical devices and articles or pharmaceuticals. Further, particularly advantageous embodiments of this aspect of the present invention are the described herein.

Also, according to a ninth aspect of the present invention, the present invention furthermore relates to a foodstuff article packaged in a plastic film of the present invention. Further, particularly advantageous embodiments of this aspect of the present invention are described herein.

Moreover, according to a tenth aspect of the present invention, the present invention also relates to a medical device or article or a pharmaceutical packaged in a plastic film of the present invention. Further, particularly advantageous embodiments of this aspect of the present invention are described herein.

Further, according to an eleventh aspect of the present invention, the present invention also relates to a method of providing a plastic food packaging film with detection properties and/or detectability, especially with detection properties and/or detectability via a metal detection device, especially a metal detector, and/or via an induction-based and/or magnetism-based and/or conductivity-based detection device and/or via an optically based device and/or via a photodetection device. Further, particularly advantageous embodiments of this aspect of the present invention herein.

Moreover, according to a twelfth aspect of the present invention, the present invention also relates to the inventive use of detectable particles for providing a plastic food packaging film with detection properties and/or detectability, especially with detection properties and/or detectability via a metal detection device, especially a metal detector, and/or via an induction-based and/or magnetism-based and/or conductivity-based detection device and/or via an optically based device and/or via a photodetection device. Further, particularly advantageous embodiments of this aspect of the present invention are described herein.

Finally, according to a thirteenth aspect of the present invention, the present invention also relates to the a multilayer film, especially a multilayer plastic film, particularly a (thermo)plastic multilayer food packaging film, especially a detectable (thermo)plastic multilayer film. Further, particularly advantageous embodiments of this aspect of the present invention are described herein.

Before the present invention will be described more in detail hereinafter, the following general remarks are given:

It will be appreciated and it goes without saying that, in the following, any embodiments, particularities, advantages, explanations, indications, configurations and the like which are described or cited hereinafter for just one aspect of the present invention for the purpose of avoiding repetitions do, of course, also apply correspondingly and mutatis mutandis in relation to all other aspects of the present invention.

Furthermore, it will be appreciated that, in the case of any values, numbers, figures, ranges etc. indicated hereinafter, any ranges etc. stated should not be understood in a restrictive manner. It will be apparent to the person skilled in the art that, depending on the individual case and/or based on the respective application, it is possible to deviate from the stated ranges, figures, values etc., without leaving the scope of the present invention.

Moreover, any values, numbers, figures, ranges, parameters and the like indicated hereinafter may be determined or ascertained, in principle, by standardized or expressly specified determination methods or else by determination methods well known per se to those skilled in the art.

Furthermore, in relation to any hereinbelow recited relative or percentage-based indications, in particular weight-based amounts, it goes without saying that these indications are, in the context of the present invention, to be selected and/or to be combined by a person skilled in the art such that the resulting sum total—including where applicable any further components/ingredients always comes to 100% or 100 wt. %, respectively.

Having stated this and with these provisions, the present invention will be described more in detail hereinafter.

BRIEF DESCRIPTION OF THE DRAWINGS

In the figures:

FIG. 3 shows each a schematic sequence of the inventive manufacturing method according to a particular embodiment.

DETAILED DESCRIPTION

Figure 1:
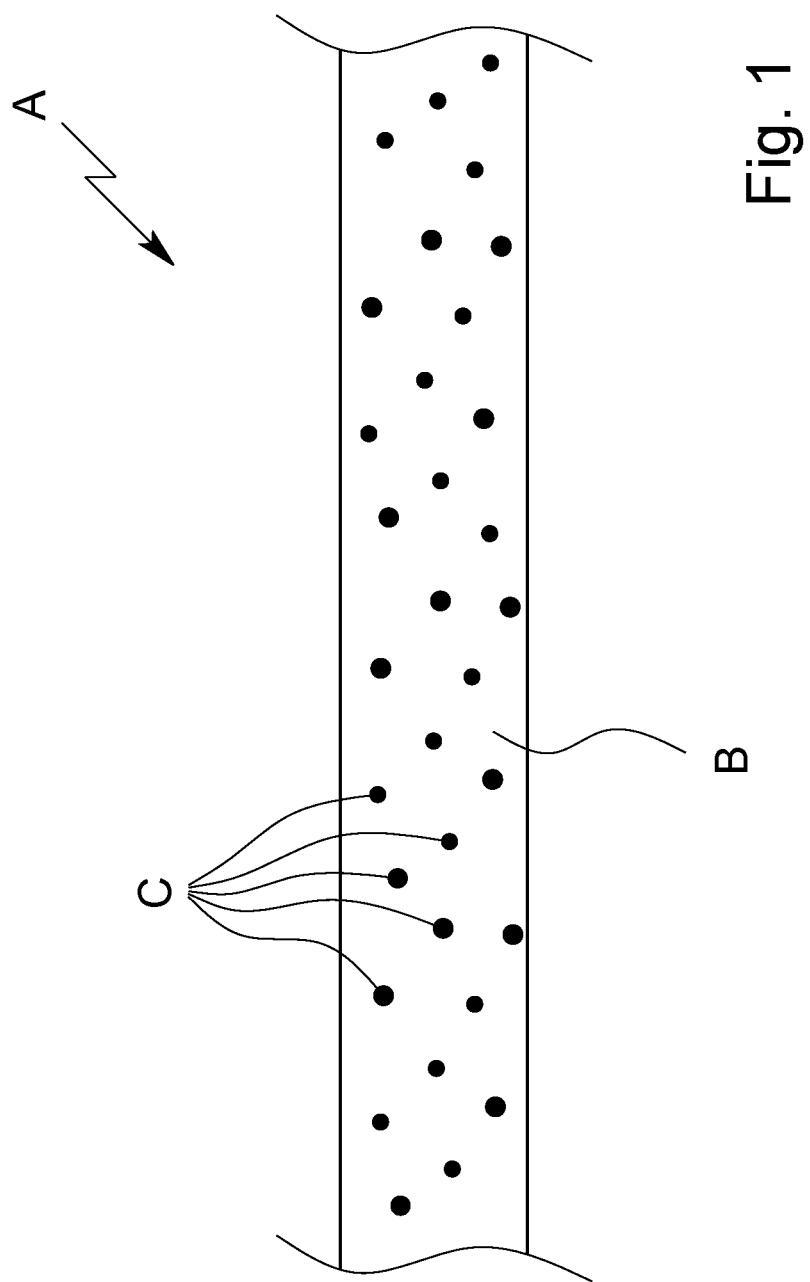
FIG. 1 shows a schematic cross-sectional view of an inventive plastic film (i.e. preferably thermoplastic film), particularly a (thermo)plastic food packaging film, comprising detectable particles incorporated therein according to a particular embodiment.

According to a first aspect of the present invention, the present invention refers to a method of manufacturing a plastic film, preferably a thermoplastic film, particularly a (thermo)plastic food packaging film, especially a detectable (thermo)plastic film, which (thermo)plastic film comprises detectable particles incorporated therein, wherein the method comprises introducing and/or adding detectable particles into a molten plastic resin to produce a mixture comprising the molten plastic resin and the detectable particles, followed by extruding the mixture comprising the molten plastic resin and the detectable particles, so as to obtain a plastic film, preferably a thermoplastic film, particularly a (thermo)plastic food packaging film, comprising the detectable particles incorporated therein, particularly in homogeneous distribution.

Applicant has, completely surprisingly, found out that it is possible to provide a plastic film (i.e. preferably a thermoplastic film), particularly a (thermo)plastic food packaging film, with detection properties and/or detectability by incorporating detectable particles therein if the detectable particles are introduced and/or added into a molten plastic resin, followed by extruding the mixture comprising the molten plastic resin and the detectable particles to form a film.

In other words, applicant has surprisingly found out that it is possible to provide a detectable plastic film (i.e. preferably a thermoplastic film), particularly a detectable (thermo)plastic food packaging film, and/or to incorporate detectable particles into a plastic film (i.e. preferably into a thermoplastic film), particularly a (thermo)plastic food packaging film, if the introduction and/or addition of the detectable particles takes place during the production process of the plastic film, namely without affecting the plastic film production process as such.

In this respect, it is not only surprising that the addition of the detectable particles does not only not affect the plastic film production nor the plastic film quality as such but also that the detection and/or detectability properties of the detectable particles withstand the drastic conditions of the production process (e.g. high temperatures in the molten state, high pressures, extrusion process etc.).

It is thus absolutely unexpected that the addition of detectable particles within the complex plastic film production process leaves the plastic production process as well as the quality of the produced plastic film unaffected, on the one hand, and also does not influence the detectability of the detectable particles, on the other hand, so that by the inventive manufacturing method it is possible to obtain a detectable plastic film, particularly a detectable plastic food packing film, comprising the detectable particles incorporated therein, particularly in homogeneous distribution.

The method of the present invention is linked to a multitude of advantages and particularities, some of which are described in the following in a non-limiting way:

The present invention provides, for the first time, an artificial plastic-based film, particularly a packaging film on the basis of a plastic material (preferably a thermoplastic material), especially a (thermo)plastic food packaging film, which film is detectable or is provided with detection properties and/or detectability, especially with detection properties and/or detectability via a metal detection device (e.g. a metal detector) and/or via an induction-based and/or magnetism-based and/or conductivity-based detection device and/or via an optically based device and/or via a photodetection device.

Particularly, by the present invention, there is provided, for the first time, a detectable plastic-based packaging film, especially a detectable (thermo)plastic food packaging film, which film unifies the advantageous properties of plastic-based films (such as e.g. tear and tensile strength, flavor sealing properties, transparency, barrier properties against oxygen and/or water vapor etc.), on the one hand, and an efficient detectability of the whole film as such, especially via economic and easily available equipment, on the other hand.

Since conventional industrial food production lines are typically equipped with metal detecting systems anyway, usually no additional detecting equipment is required, i.e. the inventive detectable plastic-based packaging film may be easily detected by conventional detecting systems usually already installed in industrial food production lines anyway.

Due to the homogeneous distribution of the detectable particles incorporated in the inventive plastic food packing film and also due to the possibility of incorporating high amounts or concentrations of the detectable particles via the inventive manufacturing method, even very small pieces of the inventive plastic food packing film can be easily detected even in industrial and/or automated packaging and/or processing and/or production processes (e.g. even small film pieces of 0.5 cm×0.5 cm size or even smaller).

Especially, the inventive detectable plastic-based film, particularly detectable plastic-based food packaging film, is even detectable in industrial and/or automated packaging and/or processing and/or production processes (such as e.g. food packaging and/or food processing and/or food production).

Due to the fact that the detectable particles are permanently and safely incorporated (with)in and/or fixed (with)in and/or immobilized with(in) the inventive plastic film, there is no danger that the detectable particles may be set free or may be transferred to a foodstuff packaged therein, not even under drastic conditions, such as processing foodstuff by e.g. cooking, boiling, heating, smoking, peeling and unpeeling, cutting, slicing etc. Furthermore, even under such drastic conditions, the detectable particles are not affected in their detectability since they are protected and immobilized by the plastic-based matrix of the inventive film into which the detectable particles are embedded and immobilized.

Furthermore, the inventive detectable plastic-based film, especially detectable plastic-based food packaging film, is based on non-toxic and food-compatible materials and possesses excellent food processing and packaging properties (particularly, above all, excellent mechanical, physicochemical and optical properties, such as e.g. excellent tear and tensile strength, high strength to breakage, excellent flavor sealing or barrier properties, impermeability to water vapor and/or oxygen, excellent barrier properties to microorganisms, absorption and/or adsorption properties e.g. as to food flavorants and colorants, good transparency etc.) and are, at the same time, detectable even in industrial and/or automated packaging and/or processing and/or production processes.

Thus, the present invention provides an efficient, economic and reliable method of manufacturing a plastic film (i.e. preferably thermoplastic film), particularly a (thermo) plastic food packaging film, especially a detectable (thermo) plastic film, which (thermo)plastic film comprises detectable particles incorporated therein, particularly in homogeneous distribution.

As delineated before, the inventive method comprises introducing and/or adding detectable particles into a molten plastic resin to produce a mixture comprising the molten plastic resin and the detectable particles, followed by extruding the mixture comprising the molten plastic resin and the detectable particles, so as to obtain a plastic film, preferably a thermoplastic film, particularly a (thermo)plastic food packaging film, comprising the detectable particles incorporated therein, particularly in homogeneous distribution.

With respect to the detectable particles used in the inventive manufacturing method, it is preferred if the detectable particles are magnetic, especially permanently magnetic, preferably ferromagnetic, ferrimagnetic or (super)paramagnetic.

The detectable particles used in the inventive manufacturing method may comprise or consist of at least one metal or metal oxide, especially iron (Fe) and/or cobalt (Co) and/or nickel (Ni) and/or their oxide(s), preferably oxide(s) of iron (Fe) and/or cobalt (Co) and/or nickel (Ni), more preferably oxide(s) of iron (Fe), especially in magnetic form.

Particularly, the detectable particles used in the present invention may comprise or consist of at least one magnetic metal or metal oxide, especially iron (Fe) and/or cobalt (Co) and/or nickel (Ni) and/or their oxide(s), preferably oxide(s) of iron (Fe) and/or cobalt (Co) and/or nickel (Ni), more preferably oxide(s) of iron (Fe).

According to the present invention, it is preferred if the detectable particles comprise or consist of at least one magnetic iron oxide, especially selected from the group consisting of magnetite ($Fe_3O_4$), maghemite ($Fe_2O_3$), hematite ($Fe_2O_3$), ferrite, goethite (FeO(OH)), lepidocrocite (FeO(OH)) and ferroxyhyte (FeO(OH)) as well as mixtures and combinations thereof, preferably magnetite ($Fe_3O_4$).

Particularly good results are reached if the detectable particles comprise iron (Fe) in weight-related amounts in the range of from 20 to 80 wt. %, especially 25 to 75 wt. %, based on the overall particle weight.

For the purpose of good detectability results, it is preferred if the detectable particles comprise a weight-related specific saturation magnetization of at least 50 $Am^2/kg$ iron (Fe), especially at least 70 $Am^2/kg$ iron (Fe), particularly at least 80 $Am^2/kg$ iron (Fe), preferably at least 90 $Am^2/kg$ iron (Fe), more preferably at least 100 $Am^2/kg$ iron (Fe), even more preferably at least 110 $Am^2/kg$ iron (Fe).

The particle sizes of the detectably: particles used in the present invention may vary within broad ranges:

According to a specific embodiment, the detectable particles may comprise absolute particle sizes, especially absolute particle diameters, in the range of from 0.01 to 1,000 micrometers, especially 0.05 to 750 micrometers, particularly 0.1 to 500 micrometers, preferably 0.2 to 400 micrometers, more preferably 0.2 to 300 micrometers, even more preferably 0.5 to 200 micrometers, most preferably 1 to 100 micrometers, especially determined via light scattering and/or laser diffraction, preferably according to standardized method pursuant to ISO 13320:2009.

According to another particular embodiment, the detectable particles may comprise mean (average) particle sizes D50, especially mean (average) particle diameters D50, in the range of from 0.05 to 500 micrometers, especially 0.1 to 250 micrometers, particularly 0.2 to 150 micrometers, preferably 0.5 to 100 micrometers, more preferably 0.8 to 75 micrometers, even more preferably 1 to 50 micrometers, most preferably 2 to 30 micrometers, especially determined via light scattering and/or laser diffraction, preferably according to standardized method pursuant to ISO 13320: 2009.

According to yet another particular embodiment of the present invention, the detectable particles may comprise mean (average) particle sizes D100, especially mean (average) particle diameters D100, in the range of from 0.1 to 800 micrometers, especially 0.2 to 400 micrometers, particularly 0.5 to 200 micrometers, preferably 1 to 150 micrometers, more preferably 2 to 125 micrometers, even more preferably 3 to 110 micrometers, most preferably 5 to 100 micrometers, especially determined via light scattering and/or laser diffraction, preferably according to standardized method pursuant to ISO 13320:2009-10.

With respect to the detectable particles used in the inventive manufacturing method, the detectable particles may comprise a density in the range of from 2 to 10 $g/cm^3$, especially 2.5 to 8 $g/cm^3$, particularly 3 to 7 $g/cm^3$, preferably 4 to 6 $g/cm^3$, more preferably 4.5 to 5.5 $g/cm^3$, preferably as determined according to standardized method pursuant to DIN EN ISO 1183-1:2013-04.

Furthermore, the detectable particles may usually comprise an apparent density (bulk density) in the range of from 1 to 8 $g/cm^3$, especially 1.2 to 5 $g/cm^3$, particularly 1.3 to 4 $g/cm^3$, preferably 1.5 to 3 $g/cm^3$, preferably as determined according to standardized method pursuant to DIN EN ISO 60-1:2000-01.

Furthermore, the detectable particles and/or the plastic film comprising the detectable particles incorporated therein is/are usually detectable by a metal detection device, especially a metal detector, and/or by an induction-based and/or magnetism-based and/or conductivity-based detection device and/or by an optically based device and/or by a photodetection device.

According to a preferred embodiment of the present invention, the detectable particles used in the present invention may comprise a surface-modification, preferably protective against oxygen and/or against oxidation, especially an antioxidant and/or protective surface coating or surface encapsulation. This specific embodiment of the present invention is particularly preferred since it preserves the properties of the used detectable particles, especially the detection properties, even under the drastic conditions of the plastic film production.

Such detectable particles comprising a surface-modification, preferably protective against oxygen and/or against oxidation, are commercially available. Furthermore, it is well-known to the skilled practitioner to provide detectable particles with such surface-modification, e.g. by contacting the surface of the detectable particles with respective surface-modifying chemicals (e.g. polysilanes, polysiloxanes, polyacrylates, polymethacrylates, polyacrylamides, starch-based polymers, cellulose-based polymers, polysaccharides, polyaminosaccharides, biopolymers etc.) or e.g. by co-precipitation methods (i.e. precipitation of detectable particles in the presence of the respective surface-modifying chemicals).

For further details as to the surface-modification of the detectable particles, reference can be made, e.g., to document WO 2006/042724 A2, which document is hereby fully incorporated by reference. Furthermore, as to the surface-modification of the detectable particles, particularly with respect to the surface-modification of magnetic iron oxide particles, reference can also be made to the following documents, which documents are hereby also fully incorporated by reference: S. Sheng-Nan et al. "Magnetic iron oxide nanoparticles: synthesis and surface coating techniques for biomedical applications", Chin. Phys. B, Vol. 23, No. 3 (2014), 037503-1 to 037503-19; A. Durdureanu-Angheluta et al. "Tailored and Functionalized Magnetite Particles for Biomedical and Industrial Applications", www.intechopen.com, pages 149 to 178 (http://cdn.intechopen.com/pdfs/30356/InTech-Tailored_and_functionalized_magnetite_particles_for_biomedical_and_industrial_applications.pdf).

According to the specific embodiment, according to which the detectable particles may comprise a surface-modification, it is preferred if the surface-modification is hydrophobic.

According to a preferred embodiment, the surface-modification is bonded, especially chemically bonded, preferably covalently bonded, to the particle surfaces. This leads to the advantage that the surface-modification is preserved even under drastic reaction conditions.

According to a particular embodiment of the present invention, the surface-modification of the detectable particles may comprise or consist of inorganic, organic or inorganic-organic polymers, especially selected from the group consisting of polysilanes, polysiloxanes, polyacrylates, polymethacrylates, polyacrylamides, starch-based polymers, cellulose-based polymers, polysaccharides, polyaminosaccharides and biopolymers as well as mixtures and combinations thereof, preferably polysilanes and polysiloxanes.

The amounts or concentrations of detectable particles used in the inventive manufacturing method may vary within broad ranges. However, amounts or concentrations of detectable particles should be selected such that the resulting film as a whole as well as pieces thereof are detectable under relevant conditions.

Typically, it is preferred if the detectable particles are used, especially introduced and/or added, in such amounts that the resulting plastic film comprising the detectable particles incorporated therein comprises 0.1 to 75 wt. %, especially 0.2 to 60 wt. %, particularly 0.3 to 50 wt. %, preferably 0.5 to 40 wt. %, more preferably 0.8 to 30 wt. %, even more preferably 1 to 15 wt. %, most preferably 1 to 10 wt. %, of the detectable particles, based on the overall weight of the plastic film comprising the detectable particles incorporated therein.

Usually, the resulting inventive plastic film comprising the detectable particles incorporated therein may comprise 0.1 to 75 wt. %, especially 0.2 to 60 wt. %, particularly 0.3 to 50 wt. %, preferably 0.5 to 40 wt. %, more preferably 0.8 to 30 wt. %, even more preferably 1 to 15 wt. %, most preferably 1 to 10 wt. %, of the detectable particles, based on the overall plastic film weight.

According to a typical embodiment of the present invention, the detectable particles are homogeneously distributed over and/or are homogeneously incorporated in the plastic film obtained.

In order words, the plastic film comprising the detectable particles incorporated therein comprises the detectable particles in homogeneous distribution. Particularly, the resulting plastic film should comprise the detectable particles incorporated therein in homogeneous distribution. Thus, it is ensured that equal detection properties of the whole film are reached.

As delineated hereinbefore, the detectable particles are permanently incorporated in and/or fixed (with)in and/or immobilized with(in) the plastic film comprising the detectable particles incorporated therein. Thus, it is ensured that the particles may not be transferred to the foodstuff during processing and/or packaging.

According to a typical embodiment, the detectable particles are introduced and/or added into the molten plastic resin in the presence of at least one dispersant (i.e. dispersing agent or dispersing aid). The presence of at least one dispersant (dispersing agent) allows for a more homogeneous distribution of the detectable particles in the final product. Furthermore, the dispersant (dispersing agent) also ensures an improved processability.

According to a particular embodiment, particularly good results are obtained if the dispersant (dispersing agent) is used in amounts, calculated as the weight ratio of detectable particles:dispersant (dispersing agent), in the range of from 2,000:1 to 1:1, especially 1,000:1 to 5:1, preferably 500:1 to 10:1, more preferably 250:1 to 15:1, even more preferably 100:1 to 20:1.

According to a particular embodiment, the dispersant (dispersing agent) is a food-compatible dispersant (dispersing agent).

According to a particular embodiment, the dispersant (dispersing agent) may be a surface-active detergent or a surface-active polymer.

Particularly, the dispersant (dispersing agent) may be a surface-active polymer having a number-average molecular weight of at least 500 g/mol, preferably at least 1,000 g/mol, more preferably at least 2,000 g/mol, and/or having a number number-average molecular weight of up to 10,000,000 g/mol, preferably of up to 1,000,000 g/mol, more preferably of up to 100,000 g/mol.

According to yet another typical embodiment, the detectable particles are introduced and/or added into the molten plastic resin in the presence of at least one lubricant, especially a zinc-based lubricant, particularly on the basis of organic zinc salt, preferably zinc stearate. The presence of at least one lubricant allows for an improved processability. The amounts or concentrations of lubricant used in the inventive manufacturing method may vary within broad ranges; typically, it is preferred if the at least one lubricant is used, especially introduced and/or added, in amounts of from 0.0001 to 10 wt. %, particularly 0.001 to 5 wt. %, preferably 0.005 to 2 wt. %, based on the overall weight of the plastic film comprising the detectable particles incorporated therein.

Typically, according to the inventive method, the plastic and/or plastic resin which is used for manufacturing the plastic film and/or which is used as a base material for the plastic film is food-compatible and/or is a food-compatible plastic, especially thermoplastic. According to a particular embodiment of the inventive method, the plastic and/or plastic resin which is used for manufacturing the plastic film and/or which is used as a base material for the plastic film may be selected from the group consisting of (i) polyolefins, especially polyethylenes, polypropylenes, polybutenes and polyisobutenes; (ii) polyamides; (iii) poly-acrylates and polymethacrylates; (iv) polycarbonates; (v) polyvinyl chlorides (PVCs) and polyvinylidene chlorides (PVDCs); (vi) polyvinyl ethers; (vii) polyacrylonitriles; (viii) polystyrenes; (ix) polysulfones; (x) polylactates; (xi) thermoplastic polyethers and polyesters; (xii) polyurethanes; as well as mixtures and combinations thereof; preferably of (i) polyolefins, especially polyethylenes, polypropylenes, polybutenes and polyisobutenes; (ii) polyamides; as well as mixtures and combinations thereof; more preferably (i) polyolefins, especially polyethylenes; (ii) polyamides; as well as mixtures and combinations thereof.

According to a particular embodiment of the inventive method, the detectable particles are introduced and/or added into the molten plastic resin in the form of a particulate compounded mixture comprising the detectable particles together with and/or distributed in a carrier plastic resin, especially a particulate masterbatch comprising the detectable particles together with and/or distributed in a carrier plastic resin, preferably in high concentrations and/or amounts. This leads to an improved processability as well as to an improved homogeneity of the distribution.

Especially, according to this particular embodiment of the inventive method, the particulate compounded mixture may comprise and/or consist of and/or be in the form of discrete particles, particularly shaped bodies, preferably in the form granules, pellets, grains, spherules, balls, beads, globules, corpuscles or the like.

In particular, according to this particular embodiment of the inventive method, the particulate compounded mixture may comprise the detectable particles in high concentrations and/or amounts, especially in amounts in the range of from 1 to 80 wt. %, especially 2 to 75 wt. %, particularly 3 to 70 wt. %, preferably 4 to 60 wt. %, more preferably 5 to 55 wt. %, even more preferably 10 to 50 wt. %, most preferably 1 to 10 wt. %, based on the particulate compounded mixture.

Especially, according to this particular embodiment of the inventive method, the carrier plastic resin of the particulate compounded mixture is compatible with and/or miscible with and/or at least essentially identical with the plastic and/or plastic resin which is used for manufacturing the plastic film and/or which is used as a base material for the plastic film.

Furthermore, according to this particular embodiment of the inventive method, the carrier plastic resin of the particulate compounded mixture is of similar or same chemical nature as is the plastic and/or plastic resin which is used for manufacturing the plastic film and/or which is used as a base material for the plastic film.

Especially, according to this particular embodiment of the inventive method, the carrier plastic resin of the particulate compounded mixture may be identical with the plastic and/or plastic resin which is used for manufacturing the plastic film and/or which is used as a base material for the plastic film.

Especially, the carrier plastic resin of the particulate compounded mixture may be selected from the group consisting of (i) polyolefins, especially polyethylenes, polypropylenes, polybutenes and polyisobutenes; (ii) polyamides; (iii) polyacrylates and polymethacrylates; (iv) polycarbonates; (v) polyvinyl chlorides (PVCs) and polyvinylidene chlorides (PVDCs); (vi) polyvinyl ethers; (vii) polyacrylonitriles; (viii) polystyrenes; (ix) polysulfones; (x) polylactates; (xi) thermoplastic polyethers and polyesters; (xii) polyurethanes; as well as mixtures and combinations thereof; preferably of (i) polyolefins, especially polyethylenes, polypropylenes, polybutenes and polyisobutenes; (ii) polyamides; as well as mixtures and combinations thereof; more preferably (i) polyolefins, especially polyethylenes; (ii) polyamides; as well as mixtures and combinations thereof.

According to a typical embodiment of the inventive method, the particulate compounded mixture may be produced by compounding the detectable particles with the molten carrier plastic resin to form a molten compound of the detectable particles and the carrier plastic resin, followed by forming particles from the compound, especially while or after solidifying the molten carrier plastic, preferably wherein melting and forming is performed in an extrusion device, particularly an extruder.

Especially, the particulate compounded mixture may be produced according to a premix process. Especially, the particulate compounded mixture may be produced by premixing and/or homogenizing the detectable particles and the carrier plastic resin, followed by the steps of melting the carrier plastic resin to form a molten compound of the detectable particles and the carrier plastic resin and then forming particles from the compound, especially while or after solidifying the molten carrier plastic. Preferably, melting and forming may be performed in an extrusion device, particularly an extruder.

Alternatively, the particulate compounded mixture may be also produced according to a split-feed process. Especially, the particulate compounded mixture may be produced by introducing and/or feeding the detectable particles into the molten carrier plastic resin to form a molten compound of the detectable particles and the carrier plastic resin, followed by the step of forming particles from the compound, especially while or after solidifying the molten carrier plastic. Preferably, melting and forming may be performed in an extrusion device, particularly an extruder, preferably a twin-screw extrusion device.

Especially, the particulate compounded mixture may further comprise at least one dispersant (dispersing agent), especially as defined hereinbefore and hereinbelow. Especially, the particulate compounded mixture may be produced from the detectable particles and the carrier plastic resin in the presence of at least one dispersant (dispersing agent), especially as defined hereinbefore and hereinbelow.

According to a particular embodiment of the inventive method, the particulate compounded mixture comprising the detectable particles together with and/or distributed in a carrier plastic resin, as defined hereinbefore, may even be used to obtain the plastic film comprising the detectable particles incorporated therein, preferably by extrusion. Especially, according to this particular embodiment of the inventive method, the particulate compounded mixture comprising the detectable particles together with and/or distributed in a carrier plastic resin, as defined hereinbefore, may be directly extruded to the plastic film comprising the detectable particles incorporated therein.

According to yet another particular embodiment of the inventive method, the step of introducing and/or adding detectable particles into a molten plastic resin to produce a mixture comprising the molten plastic resin and the detectable particles, on the one hand, and extruding the mixture comprising the molten plastic resin and the detectable particles, so as to obtain the plastic film comprising the detectable particles incorporated therein, on the other hand, may be performed separately from each other and/or offset and/or on a staggered basis and/or chronologically shifted and/or at staggered points in time. Especially, according to this particular embodiment of the inventive method, first, a preferably particulate compounded mixture comprising the detectable particles together with and/or distributed in a carrier plastic resin, especially a particulate masterbatch comprising the detectable particles together with and/or distributed in a carrier plastic resin, preferably in high concentrations and/or amounts, particularly as defined above, is produced, optionally followed by intermediate storing of the compounded mixture thus produced, and then, especially at a staggered or later point in time and/or chronologically shifted, the compounded mixture thus produced is molten and extruded, preferably via melt extrusion, so as to obtain the plastic film comprising the detectable particles incorporated therein. Especially, the particulate compounded mixture comprising the detectable particles together with and/or distributed in a carrier plastic resin, as defined above, may be used for the step of extruding, so as to obtain the plastic film comprising the detectable particles incorporated therein.

Typically, the step of extruding the mixture comprising the molten plastic resin and the detectable particles may be performed such to produce a flat or tubular film, preferably a tubular film.

Particularly, the step of extruding the mixture comprising the molten plastic resin and the detectable particles may be performed using an extrusion die, especially an annular die.

Usually, the step of extruding the mixture comprising the molten plastic resin and the detectable particles may be followed by and/or combined an inflation step and/or a step of orienting (stretching) the film and/or a step of maintaining a constant diameter of the extruded tube, especially performed with air, preferably pressurized air.

According to a particular embodiment of the inventive method, the step of extruding the mixture comprising the molten plastic resin and the detectable particles may be performed as a co-extrusion process, wherein the plastic film comprising the detectable particles incorporated therein is co-extruded and/or combined with at least one other plastic film of same or different plastic material, particularly so as to obtain a detectable plastic film comprising detectable particles incorporated therein and to which at least one other plastic film has been co-extruded on at least one of its both sides. In other words, according to this particular embodiment of the inventive method, a detectable multilayer film according to the present invention is produced.

According to another particular embodiment of the inventive method, after the step of extruding the mixture comprising the molten plastic resin and the detectable particles, the resulting plastic film comprising the detectable particles incorporated therein may be laminated and/or combined with at least one other plastic film of same or different material on at least one of its both sides, particularly so as to obtain a detectable plastic film comprising detectable particles incorporated therein and to which at least one other plastic film has been provided and/or adhered and/or laminated on at least one of its both sides. In other words, also according to this particular embodiment of the inventive method, a detectable multilayer film according to the present invention is produced.

Furthermore, according to a preferred embodiment of the inventive method, the step of extruding the mixture comprising the molten plastic resin and the detectable particles may be performed as a co-extrusion process, wherein the plastic film comprising the detectable particles incorporated therein is co-extruded and/or combined with at least one other plastic film of different plastic material on its both sides, so as to obtain a detectable plastic film comprising detectable particles incorporated therein and to which at least one other plastic film has been co-extruded on its both sides. Especially, according to this particular embodiment of the inventive method, a multilayer film structure results, wherein the plastic film comprising the detectable particles incorporated therein forms the core layer of the multilayer film structure, to the two opposing sides of which core layer at least one other plastic film has been co-extruded each, which form the outer layers of the multilayer film structure. Especially, a multilayer film structure results, wherein the plastic film comprising the detectable particles incorporated therein may comprise or consists of a polyethylene resin and the other plastic films may comprise or consist of a polyamide resin each, especially wherein the other plastic films comprising or consisting of a polyamide resin each are co-extruded to and/or attached to the plastic film comprising or consisting of a polyethylene film via an adhesive layer or film each, preferably via rubber-modified polyethylene-based or a rubber-modified ethylene-vinylacetate (EVA)-based adhesive layer or film, particularly via a maleic anhydride modified polyethylene-based or a maleic anhydride modified ethylene-vinylacetate (EVA)-based adhesive layer or film.

Moreover, according to yet another particular embodiment of the inventive method, the step of extruding the mixture comprising the molten plastic resin and the detectable particles may be performed as a co-extrusion process, wherein a mixture comprising a molten polyethylene resin and the detectable particles is co-extruded with a molten polyamide resin, so as to obtain a multilayer film comprising a polyethylene core layer comprising the detectable particles incorporated therein and at least one outer polyamide layer adhered to each side of the core layer. Especially, a particulate compounded mixture comprising the detectable particles together with and/or distributed in a carrier plastic resin, especially a particulate masterbatch comprising the detectable particles together with and/or distributed in a carrier plastic resin, as defined hereinbefore, may be used to produce the mixture comprising the molten polyethylene resin and the detectable particles.

According to the particular embodiment of the inventive method where an inventive multilayer film is produced, the relative amounts of the multilayer are usually slightly different from those of the mere inventive monolayer plastic film due to the presence of additional layers. Typically, according to the particular embodiment of the inventive method where an inventive multilayer film is produced, the detectable particles may be used, especially introduced and/or added, in such amounts that the resulting multilayer film comprising the detectable particles incorporated therein comprises 0.1 to 50 wt. %, especially 0.2 to 40 wt. %, particularly 0.3 to 30 wt. %, preferably 0.5 to 25 wt. %, more preferably 0.8 to 20 wt. %, even more preferably 1 to 15 wt. %, most preferably 1 to 10 wt. %, of the detectable particles, based on the overall weight of the multilayer film. In other words, according to the particular embodiment of the inventive method where an inventive multilayer film is produced, the multilayer film comprising the detectable particles incorporated therein comprises 0.1 to 50 wt. %, especially 0.2 to 40 wt. %, particularly 0.3 to 30 wt. %, preferably 0.5 to 25 wt. %, more preferably 0.8 to 20 wt. %, even more preferably 1 to 15 wt. %, most preferably 1 to 10 wt. %, of the detectable particles, based on the overall multilayer film weight.

In order to modify certain film properties, according to a particular embodiment of the present invention, it is possible that the plastic film comprising the detectable particles incorporated therein and/or the multilayer film as described hereinabove may be provided, on at least one of its both sides, with a film or coating having moisture and/or oxygen barrier properties, especially with a polyvinylidene chloride (PVDC) film or coating.

According to a specific embodiment of the present invention, the plastic film comprising the detectable particles incorporated therein and/or the multilayer film as described hereinabove may be provided, on at least one of its both sides, with at least one food additive. Especially, the at least one food additive may comprise a flavoring and/or coloring and/or odoring food additive, especially in the form of a preferably aqueous solution or dispersion, particularly a liquid smoke or caramel.

Usually, the inventive manufacturing method further comprises adding at least one plasticizer to the plastic film, especially during extruding. Especially, the plasticizer may be used, especially added, in such amounts that the resulting plastic film comprises 0.5 to 40 wt. %, especially 1 to 30 wt. %, particularly 2 to 25 wt. %, preferably 3 to 20 wt. %, more preferably 5 to 15 wt. %, of the plasticizer, based on the overall weight of the plastic film comprising the detectable particles incorporated therein. Especially, the plastic film comprising the detectable particles incorporated therein may comprise 0.5 to 40 wt. %, especially 1 to 30 wt. %, particularly 2 to 25 wt. %, preferably 3 to 20 wt. %, more preferably 5 to 15 wt. %, of the plasticizer, based on the overall plastic film weight. Especially, the plasticizer may be a food-compatible plasticizer.

Furthermore, according to a second aspect of the present invention, there is provided a plastic film, preferably a thermoplastic film, particularly a (thermo)plastic food packaging film, especially a detectable (thermo)plastic film, which (thermo)plastic film comprises detectable particles incorporated therein, particularly in homogeneous distribution.

Further, according to this aspect of the present invention, there is provided a plastic film, preferably a thermoplastic film, particularly a (thermo)plastic food packaging film, especially a detectable (thermo)plastic film, which (thermo) plastic film comprises detectable particles incorporated therein, particularly in homogeneous distribution, which plastic film is obtainable according to a manufacturing method as defined and described hereinabove.

The particularities and advantages of the inventive plastic film have already been described in detail in connection with the inventive manufacturing method, so that reference can be made to the above explanations in order to avoid unnecessary repetitions.

With respect to the detectable particles used in the inventive plastic film, the detectable particles may be magnetic, especially permanently magnetic, preferably ferromagnetic, ferrimagnetic or (super)paramagnetic.

The detectable particles may comprise or consist of at least one metal or metal oxide, especially iron (Fe) and/or cobalt (Co) and/or nickel (Ni) and/or their oxide(s), preferably oxide(s) of iron (Fe) and/or cobalt (Co) and/or nickel (Ni), more preferably oxide(s) of iron (Fe), especially in magnetic form.

The detectable particles may comprise or consist of at least one magnetic metal or metal oxide, especially iron (Fe) and/or cobalt (Co) and/or nickel (Ni) and/or their oxide(s), preferably oxide(s) of iron (Fe) and/or cobalt (Co) and/or nickel (Ni), more preferably oxide(s) of iron (Fe).

The detectable particles may comprise or consist of at least one magnetic iron oxide, especially selected from the group consisting of magnetite ($Fe_3O_4$), maghemite ($Fe_2O_3$), hematite ($Fe_2O_3$), ferrite, goethite (FeO(OH)), lepidocrocite (FeO(OH)) and ferroxyhyte (FeO(OH)) as well as mixtures and combinations thereof, preferably magnetite ($Fe_3O_4$).

The detectable particles used in the present invention may comprise iron (Fe) in weight-related amounts in the range of from 20 to 80 wt. %, especially 25 to 75 wt. %, based on the overall particle weight.

Furthermore, the detectable particles may comprise a weight-related specific saturation magnetization of at least 50 $Am^2$/kg iron (Fe), especially at least 70 $Am^2$/kg iron (Fe), particularly at least 80 $Am^2$/kg iron (Fe), preferably at least 90 $Am^2$/kg iron (Fe), more preferably at least 100 $Am^2$/kg iron (Fe), even more preferably at least 110 $Am^2$/kg iron (Fe).

The particle sizes of the detectable particles used in the present invention may vary within broad ranges.

According to a particular embodiment, the detectable particles may comprise absolute particles sizes, especially absolute particle diameters, in the range of from 0.01 to 1,000 micrometers, especially 0.05 to 750 micrometers, particularly 0.1 to 500 micrometers, preferably 0.2 to 400 micrometers, more preferably 0.2 to 300 micrometers, even more preferably 0.5 to 200 micrometers, most preferably 1 to 100 micrometers, especially determined via light scattering and/or laser diffraction, preferably according to standardized method pursuant to ISO 13320:2009.

Furthermore, the detectable particles may comprise mean (average) particle sizes D50, especially mean (average) particle diameters D50, in the range of from 0.05 to 500 micrometers, especially 0.1 to 250 micrometers, particularly 0.2 to 150 micrometers, preferably 0.5 to 100 micrometers, more preferably 0.8 to 75 micrometers, even more preferably 1 to 50 micrometers, most preferably 2 to 30 micrometers, especially determined via light scattering and/or laser diffraction, preferably according to standardized method pursuant to ISO 13320:2009.

Further, the detectable particles may comprise mean (average) particle sizes D100, especially mean (average) particle diameters D100, in the range of from 0.1 to 800 micrometers, especially 0.2 to 400 micrometers, particularly 0.5 to 200 micrometers, preferably 1 to 150 micrometers, more preferably 2 to 125 micrometers, even more preferably to 110 micrometers, most preferably 5 to 100 micrometers, especially determined via light scattering and/or laser diffraction, preferably according to standardized method pursuant to ISO 13320:2009-10.

Furthermore, the detectable particles may comprise a density in the range of from 2 to 10 $g/cm^3$, especially 2.5 to 8 $g/cm^3$, particularly 3 to 7 $g/cm^3$, preferably 4 to 6 $g/cm^3$, more preferably 4.5 to 5.5 $g/cm^3$, preferably as determined according to standardized method pursuant to DIN EN ISO 1183-1:2013-04.

Further, the detectable particles may comprise an apparent density (bulk density) in the range of from to 8 $g/cm^3$, especially 1.2 to 5 $g/cm^3$, particularly 1.3 to 4 $g/cm^3$, preferably 1.5 to 3$g/cm^3$, preferably as determined according to standardized method pursuant to DIN EN 150 60-1:2000-01.

According to a particular embodiment, the detectable particles and/or the plastic film of the present invention comprising the detectable particles incorporated therein is/are detectable by a metal detection device, especially a metal detector, and/or by an induction-based and/or magnetism-based and/or conductivity-based detection device and/or by an optically based device and/or by a photodetection device.

According to a particular and preferred embodiment of the present invention, the detectable particles used in the present invention may comprise a surface-modification, preferably protective against oxygen and/or against oxidation, especially an antioxidant and/or protective surface coating or surface encapsulation. The advantages and particularities linked to this specific embodiment have already been delineated hereinabove in the context of the inventive manufacturing method, so that reference can be made to the respective above explanations in order to avoid unnecessary repetitions.

According to this specific embodiment of the present invention, the surface-modification of the detectable particles may be hydrophobic.

Especially, the surface-modification may be bonded, especially chemically bonded, preferably covalently bonded, to the particle surfaces.

Especially, the surface-modification may comprise or consist of inorganic, organic or inorganic-organic polymers, especially selected from the group consisting of polysilanes, polysiloxanes, polyacrylates, polymethacrylates, polyacrylamides, starch-based polymers, cellulose-based polymers, polysaccharides, polyaminosaccharides and biopolymers as well as mixtures and combinations thereof, preferably polysilanes and polysiloxanes.

As delineated hereinbefore in connection with the inventive manufacturing method, the detectable particles are homogeneously distributed over and/or are homogeneously incorporated in the plastic film comprising the detectable particles incorporated therein. In other words, the plastic film comprising the detectable particles incorporated therein preferably comprises the detectable particles in homogeneous distribution and/or comprises the detectable particles incorporated therein in homogeneous distribution.

The detectable particles are permanently incorporated in and/or fixed (with)in and/or immobilized with(in) the plastic film comprising the detectable particles incorporated therein.

The inventive plastic film comprising the detectable particles incorporated therein is typically detectable by a metal detection device, especially a metal detector, and/or by an induction-based and/or magnetism-based and/or conductivity-based detection device and/or by an optically based device and/or by a photodetection device.

The amounts or concentrations of detectable particles in the inventive plastic film may vary in broad ranges: Typically, the inventive plastic film comprising the detectable particles incorporated therein comprises the detectable particles in amounts of from 0.1 to 75 wt. %, especially 0.2 to 60 wt. %, particularly 0.3 to 50 wt. %, preferably 0.5 to 40 wt. %, more preferably 0.8 to 30 wt. %, even more preferably 1 to 15 wt. %, most preferably 1 to 10 wt. %, based on the overall weight of the plastic film comprising the detectable particles incorporated therein.

Typically, the inventive plastic film comprising the detectable particles incorporated therein is self-supporting or is a self-supporting film.

However, according to a particular embodiment of the present invention, the inventive plastic film comprising the detectable particles incorporated therein may also be provided and/or supported with a preferably fibrous substrate, particularly a paper, a web or a fabric (e.g. on its inside, e.g., for improved absorbing and/or adsorbing of food flavorants and/or odorants such as liquid smoke etc.)

Typically, the plastic and/or plastic resin which is used for manufacturing the inventive plastic film and/or which is used as a base material for the plastic film may be any plastic and/or plastic resin which is food-compatible and/or is a food-compatible plastic, especially thermoplastic.

Especially, the plastic and/or plastic resin which is used for manufacturing the inventive plastic film and/or which is used as a base material for the inventive plastic film may be selected from the group consisting of (i) polyolefins, especially polyethylenes, polypropylenes, polybutenes and polyisobutenes; (ii) polyamides; (iii) polyacrylates and polymethacrylates; (iv) polycarbonates; (v) polyvinyl chlorides (PVCs) and polyvinylidene chlorides (PVDCs); (vi) polyvinyl ethers; (vii) polyacrylonitriles; (viii) polystyrenes; (ix) polysulfones; (x) polylactates; (xi) thermoplastic polyethers and polyesters; (xii) polyurethanes; as well as mixtures and combinations thereof; preferably of (i) polyolefins, especially polyethylenes, polypropylenes, polybutenes and polyisobutenes; (ii) polyamides; as well as mixtures and combinations thereof; more preferably (i) polyolefins, especially polyethylenes; (ii) polyamides; as well as mixtures and combinations thereof.

According to a particular embodiment of the present invention, the inventive plastic film comprising the detectable particles incorporated therein may form part of a detectable multilayer film. In such embodiment, the inventive plastic film comprising the detectable particles incorporated therein may be combined with, especially co-extruded with and/or laminated with, preferably co-extruded with, at least one other plastic film of same or different material, preferably of a different material made of a plastic, particularly so as to form a detectable multilayer film. Particularly, the inventive plastic film comprising the detectable particles incorporated therein may be, on at least one of its both sides, combined with at least one other plastic film of same or different material, preferably of a different material made of a plastic, preferably via co-extrusion or lamination, particularly so as to form a detectable multilayer film. According to a particular embodiment of the present invention, the inventive plastic film comprising the detectable particles incorporated therein may be combined with, especially co-extruded with and/or laminated with, preferably co-extruded with, at least one other plastic film of same or different plastic material, particularly so as to obtain a detectable plastic film comprising detectable particles incorporated therein and to which at least one other plastic film has been co-extruded on at least one of its both sides, preferably on both of its sides, particularly so as to form a detectable multilayer film.

According to yet another particular embodiment of the present invention, the inventive plastic film comprising the detectable particles incorporated therein may be combined with, especially co-extruded with and/or laminated with, preferably co-extruded with, at least one other plastic film of different plastic material on its both sides, so as to obtain a detectable plastic film comprising detectable particles incorporated therein and to which at least one other plastic film has been attached and/or adhered and/or co-extruded and/or laminated, preferably co-extruded, on its both sides, particularly so as to obtain a detectable plastic film and/or a detectable multilayer film (structure).

Especially, according to this embodiment, a detectable multilayer film structure results, wherein the plastic film comprising the detectable particles incorporated therein forms the core layer of the multilayer film structure, to the two opposing sides of which core layer at least one other plastic film has been attached and/or adhered and/or co-extruded and/or laminated, preferably co-extruded, each, which form the outer layers of the multilayer film structure.

Especially, a detectable multi layer film structure results, wherein the plastic film comprising the detectable particles incorporated therein may comprise or consist of a polyethylene resin and the other plastic films may comprise or consist of a polyamide resin each, especially wherein the other plastic films comprising or consisting of a polyamide resin each may be co-extruded to and/or attached to the plastic film comprising or consisting of a polyethylene film via an adhesive layer or film each (preferably via rubber-modified polyethylene-based or a rubber-modified ethylene-vinylacetate (EVA)-based adhesive layer or film, particularly via a maleic anhydride modified polyethylene-based or a maleic anhydride modified ethylene-vinylacetate (EVA)-based adhesive layer or film).

Especially, according to this embodiment, a detectable multilayer film structure results, wherein the multilayer film comprises a polyethylene core layer comprising the detectable particles incorporated therein and at least one outer polyamide layer adhered to each side of the core layer.

In other words, according to a particular embodiment of the present invention, the inventive plastic film comprising the detectable particles incorporated therein may be part of a multi layer film. Especially, according to this specific embodiment, the inventive plastic film comprising the detectable particles incorporated therein, as defined hereinabove, may comprise or consist of a polyethylene resin as the plastic material and forms the core layer of the multilayer film, wherein to both opposing sides of the core layer at least one other plastic film comprising or consisting of a polyimide resin is adhered, preferably coextruded, which other plastic films form the outer layers of the multilayer film, especially wherein an adhesive layer or film may be positioned between the outer layers and the core layer (preferably a rubber-modified polyethylene-based or a rubber-modified ethylene-vinylacetate (EVA)-based adhesive layer or film, particularly a maleic anhydride modified polyethylene-based or a maleic anhydride modified ethylene-vinylacetate (EVA)-based adhesive layer or film).

According to the particular embodiment of the inventive method where the inventive film is or comprises a detectable multilayer film, the relative amounts of the multilayer are usually slightly different from those of the mere inventive monolayer plastic film due to the presence of additional layers. Typically, according to the particular embodiment of the inventive method where an inventive multilayer film is provided, the detectable particles are used, especially introduced and/or added, in such amounts that the inventive multilayer film comprising the detectable particles incorporated therein comprises 0.1 to 50 wt. %, especially 0.2 to 40 wt. %, particularly 0.3 to 30 wt. %, preferably 0.5 to 25 wt. %, more preferably 0.8 to 20 wt. %, even more preferably 1 to 15 wt. %, most preferably 1 to 10 wt. %, of the detectable particles, based on the overall weight of the multilayer film. In other words, according to the particular embodiment of the inventive method where the inventive film is or comprises a detectable multilayer film, the multilayer film comprising the detectable particles incorporated therein comprises 0.1 to 50 wt. %, especially 0.2 to 40 wt. %, particularly 0.3 to 30 wt. %, preferably 0.5 to 25 wt. %, more preferably 0.8 to 20 wt. %, even more preferably 1 to 15 wt. %, most preferably 1 to 10 wt. %, of the detectable particles, based on the overall multilayer film weight.

According to a particular embodiment of the present invention, the inventive plastic film comprising the detectable particles incorporated therein and/or the inventive multilayer film as defined hereinbefore, respectively, may be provided, on at least one of its both sides, with a film or coating having moisture and/or oxygen barrier properties, especially with a polyvinylidene chloride (PVDC) film or coating.

Furthermore, according to yet another particular embodiment of the present invention, the inventive plastic film comprising the detectable particles incorporated therein and/or the inventive multilayer film as defined hereinbefore, respectively, may comprise and/or may be provided with, especially on at least one of its both sides, at least one food additive. Especially, the at least one food additive may comprise a flavoring and/or coloring and/or adoring food additive, especially in the form of a preferably aqueous solution or dispersion, particularly a liquid smoke or caramel. Especially, the plastic film and/or the inventive multilayer film as defined hereinbefore, respectively, is capable of reversibly retaining and/or absorbing the at least one food additive and to again release and/or transfer the retained and/or absorbed food additive to a foodstuff encased therein or therewith, especially when the encased foodstuff is subjected to cooking and/or processing.

Furthermore, according to yet another particular embodiment of the present invention, the inventive plastic film comprising the detectable particles incorporated therein and/ or the inventive multilayer film as defined hereinbefore, respectively, may further comprise and/or be provided with at least one plasticizer to the plastic film. Especially, the inventive plastic film comprising the detectable particles incorporated therein and/or the inventive multilayer film as defined hereinbefore, respectively, may comprise 0.5 to 40 wt. %, especially 1 to 30 wt. %, particularly 2 to 25 wt. %, preferably 3 to 20 wt. %, more preferably 5 to 15 wt. %, of the plasticizer, based on the overall film weight, especially the overall weight of the plastic film comprising the detectable particles incorporated therein and/or the multilayer film as defined hereinbefore. Especially, the plasticizer is a food-compatible plasticizer.

The plastic film of the present invention comprising the detectable particles incorporated therein and/or the inventive multilayer film as defined hereinbefore, respectively, may be in the form of a flat film, a sheet, a tubular film (tube), a casing or a bag.

Particularly, the inventive plastic film comprising the detectable particles incorporated therein and/or the inventive multilayer film as defined hereinbefore, respectively, may be flat (planar) or tubular, preferably tubular.

Especially, the inventive plastic film comprising the detectable particles incorporated therein and/or the inventive multilayer film as defined hereinbefore, respectively, may form and/or may be a tube, especially a seamless tube.

Furthermore, the inventive plastic film comprising the detectable particles incorporated therein and/or the inventive multilayer film as defined hereinbefore, respectively, may be a tubular film, preferably a seamless tubular film.

According to another particular embodiment of the present invention, the inventive plastic film comprising the detectable particles incorporated therein and/or the inventive multilayer film as defined hereinbefore, respectively, may form and/or may be a casing, especially a tubular casing, preferably a seamless tubular casing.

The inventive plastic film comprising the detectable particles incorporated therein and/or the inventive multilayer film as defined hereinbefore, respectively, may be shirred.

Particularly, the plastic film comprising the detectable particles incorporated therein and/or the inventive multilayer film as defined hereinbefore, respectively, may form and/or may be a shirred casing, especially a shirred tubular casing, preferably a shined seamless tubular casing.

According to a particular embodiment of the present invention, the plastic film comprising the detectable particles incorporated therein and/or the inventive multilayer film as defined hereinbefore, respectively, may be a monolayer or multilayer food packaging film, especially a monoaxially or biaxially oriented (stretched) monolayer or multilayer food packaging film.

According to yet another particular embodiment of the present invention, the plastic film comprising the detectable particles incorporated therein and/or the inventive multilayer film as defined hereinbefore, respectively, may be monoaxially or biaxially oriented (stretched), preferably biaxially oriented (stretched).

According to a specific embodiment of the present invention, the plastic film comprising the detectable particles incorporated therein and/or the inventive multilayer film as defined hereinbefore, respectively, is (co-)extruded and/or has been produced by (co-)extrusion.

Also the thickness of the inventive plastic film and/or the inventive multilayer film as defined hereinbefore, respectively, may vary within broad ranges:

Typically, the plastic film comprising the detectable particles incorporated therein and/or the inventive multilayer film as defined hereinbefore, respectively, may have an overall thickness in the range of from 1 to 2,000 micrometers, especially in the range of from 2 to 1,000 micrometers, preferably in the range of from 5 to 750 micrometers, more preferably in the range of from 10 to 500 micrometers, even more preferably in the range of from 20 to 250 micrometers.

Furthermore, the plastic film of the present invention comprising the detectable particles incorporated therein and/or the inventive multilayer film as defined hereinbefore, respectively, may have an overall thickness of at least 5 micrometers, especially of at least 10 micrometers, preferably of at least 15 micrometers, more preferably of at least 20 micrometers, even more preferably of at least 30 micrometers.

Furthermore, the plastic film of the present invention comprising the detectable particles incorporated therein and/or the inventive multilayer film as defined hereinbefore, respectively, may have an overall thickness of up to 5,000 micrometers, especially of up to 2,000 micrometers, preferably of up to 1,000 micrometers, more preferably of up to 750 micrometers, even more preferably of up to 500 micrometers.

The plastic film of the present invention and/or the inventive multilayer film as defined hereinbefore, respectively, possesses a multitude of excellent properties:

First, the plastic film comprising the detectable particles incorporated therein and/or the inventive multilayer film as defined hereinbefore, respectively, is impermeable to microorganisms and/or has barrier properties against microorganisms.

Furthermore, the plastic film comprising the detectable particles incorporated therein and/or the inventive multilayer film as defined hereinbefore, respectively, usually has a shrinkage value (shrinkability) of at least 20%, especially of at least 30%, preferably of at least 40%), at a temperature of 90° C. in the longitudinal and/or transverse direction, preferably both in the longitudinal and transverse directions, especially as determined according to ASTM D2732.

Moreover, the inventive plastic film comprising the detectable particles incorporated therein and/or the inventive multilayer film as defined hereinbefore, respectively, typically has a shrinkage value (shrinkability) in the range of from 10% to 70%, especially of from 20% to 60%, at a temperature of 90° C. in the longitudinal and/or transverse direction, preferably both in the longitudinal and transverse directions, especially as determined according to ASTM D2732, particularly determined as the unrestrained shrink at a temperature of 90° C. (water bath) for 10 seconds.

Further, the inventive plastic film comprising the detectable particles incorporated therein and/or the inventive multilayer film as defined hereinbefore, respectively, usually has a tensile strength in the longitudinal and/or transverse direction, preferably both in the longitudinal and transverse directions, in the range of from 15 to 100 MPa, especially in the range of from 20 to 80 MPa, especially as determined according to ASTM D-882, Method A.

Furthermore, the inventive plastic film comprising the detectable particles incorporated therein and/or the inventive multilayer film as defined hereinbefore, respectively, usually has an elongation at break in the longitudinal and/or transverse direction, preferably both in the longitudinal and transverse directions, in the range of from 20 to 300 especially in the range of from 40 to 200%, especially as determined according to ASTM D-882, Method A.

Furthermore, the inventive plastic film comprising the detectable particles incorporated therein and/or the inventive multilayer film as defined hereinbefore, respectively, usually has a (tensile) modulus in the longitudinal and/or transverse direction, preferably both in the longitudinal and transverse directions, in the range of from 100 to 400 MPa, especially in the range of 150 to 400 MPa, especially as determined from the respective tensile curve.

Further, the inventive plastic film comprising the detectable particles incorporated therein and/or the inventive multilayer film as defined hereinbefore, respectively, usually has an oxygen transmission rate ($O_2$ transmission rate) of less than 90 $cm^3/m^2$/4 hours, especially of less than 80 $cm^3/m^2$/24 hours, preferably of less than 75 $cm^3/m^2$ /24 hours, more preferably of less than 65 $cm^3/m^2$/24 hours, at a pressure of 1 atmosphere (101.325 kPa) and at a temperature of 23° C., especially as determined according to ASTM D-3985-81.

Especially, the inventive plastic film comprising the detectable particles incorporated therein and/or the inventive multilayer film as defined hereinbefore, respectively, usually has an oxygen transmission rate ($O_2$ transmission rate) in the range of from 1 to 90 $cm^3/m^2/24$ hours, especially in the range of from 5 to 80 $cm^3$ /$m^2/24$ hours, preferably in the range of from 10 to 75 $cm^3/m^2/24$ hours, more preferably in the range of from 20 to 65 $cm^3/m^2/24$ hours, at a pressure of 1 atmosphere (101.325 kPa) and at a temperature of 23° C., especially as determined according to ASTM D-3985-81.

Finally, the inventive plastic film comprising the detectable particles incorporated therein and/or the inventive multilayer film as defined hereinbefore, respectively, usually has a water vapor transmission rate (WVTR) in the range of from 5 to 500 $g/m^2/24$ hours, especially in the range of from 10 to 400 $g/m^2/24$ hours, preferably in the range of from 25 to 300 $g/m^2/24$ hours, more preferably in the range of from 50 to 250 $g/m^2/24$ hours, especially as determined according to ASTM F1249-06.

With respect to further details as to the second aspect of the present invention, reference may be made to the above description of the first aspect of the present invention, which also applies as to the second aspect of the present invention accordingly.

Moreover, according to a third aspect of the present invention, the present invention also relates to the use of an inventive plastic film as described hereinbefore for packaging and/or processing and/or producing foodstuff.

According to this aspect of the present invention, the inventive detectable plastic film may be used in an industrial and/or automated packaging and/or processing and/or production line equipped with at least one metal detection device, especially a metal detector, and/or at least one induction-based and/or magnetism-based and/or conductivity-based detection device and/or at least one optically based device and/or at least one photodetection device.

With respect to further details as to the third aspect of the present invention, reference may be made to the above explanations as to the other inventive aspects, which apply accordingly also to the third aspect of the present invention.

Further, according to a fourth aspect of the present invention, the present invention also refers to the use of an inventive plastic film as described hereinbefore for enhancing and/or improving food safety and/or food security, especially in packaging and/or processing and/or producing foodstuff.

With respect to further details as to the fourth aspect of the present invention, reference may be made to the above explanations as to the other inventive aspects, which apply accordingly also to the fourth aspect of the present invention.

Furthermore, according to a fifth aspect of the present invention, the present invention also relates to the use of an inventive plastic film as described hereinbefore for detecting undesired residues or remainders of the inventive plastic film on foodstuff surfaces and/or within or inside foodstuff.

With respect to further details as to the fifth aspect of the present invention, reference may be made to the above explanations as to the other inventive aspects, which apply accordingly also to the fifth aspect of the present invention.

Also, according to a sixth aspect of the present invention, the present invention also refers to the use of an inventive plastic film as described hereinbefore for detecting undesired residues or remainders of the inventive plastic film in industrial and/or automated packaging and/or processing and/or production processes.

With respect to further details as to the sixth aspect of the present invention, reference may be made to the above explanations as to the other inventive aspects, which apply accordingly also to the sixth aspect of the present invention.

Furthermore, according to a seventh aspect of the present invention, the present invention also refers to the use of an inventive plastic film as described hereinbefore for packaging and/or processing and/or producing medical devices and articles or pharmaceuticals.

With respect to further details as to the seventh aspect of the present invention, reference may be made to the above explanations as to the other inventive aspects, which apply accordingly also to the seventh aspect of the present invention.

Further, according to an eighth aspect of the present invention, the present invention relates to the use of an inventive plastic film as described hereinbefore for enhancing and/or improving safety and/or security in packaging and/or processing and/or producing medical devices and articles or pharmaceuticals.

With respect to further details as to the eighth aspect of the present invention, reference may be made to the above explanations as to the other inventive aspects, which apply accordingly also to the eighth aspect of the present invention.

Moreover, according to a ninth aspect of the present invention, the present invention refers to a foodstuff article packaged in an inventive plastic film as described hereinbefore.

With respect to further details as to the ninth aspect of the present invention, reference may be made to the above explanations as to the other inventive aspects, which apply accordingly also to the ninth aspect of the present invention.

Moreover, according to a tenth aspect of the present invention, the present invention also relates to a medical device or article or a pharmaceutical packaged in an inventive plastic film as described hereinbefore.

With respect to further details as to the tenth aspect of the present invention, reference may be made to the above explanations as to the other inventive aspects, which apply accordingly also to the tenth aspect of the present invention.

Also, according to an eleventh aspect of the present invention, the present invention relates to a method for providing a method of providing a plastic food packaging film with detection properties and/or detectability, especially with detection properties and/or detectability via a metal detection device, especially a metal detector, and/or via an induction-based and/or magnetism-based and/or conductivity-based detection device and/or via an optically based device and/or via a photodetection device, wherein said method comprises incorporating detectable particles in and/or or into the plastic food packaging film.

According to this inventive aspect, the method comprises introducing and/or adding detectable particles into a molten plastic resin to produce a mixture comprising the molten plastic resin and the detectable particles, followed by extruding the mixture comprising the molten plastic resin and the detectable particles, so as to obtain a plastic film, preferably a thermoplastic film, particularly a (thermo)plastic food packaging film, comprising the detectable particles incorporated therein, particularly in homogeneous distribution.

With respect to further details as to the eleventh aspect of the present invention, reference may be made to the above explanations as to the other inventive aspects, which apply accordingly also to the eleventh aspect of the present invention.

Moreover, according to an twelfth aspect of the present invention, the present invention also refers to the use of detectable particles for providing a plastic food packaging film with detection properties and/or detectability, especially with detection properties and/or detectability via a metal detection device, especially a metal detector, and/or via an induction-based and/or magnetism-based and/or conductivity-based detection device and/or via an optically based device and/or via a photodetection device, wherein detectable particles are incorporated in and/or into the plastic food packaging film.

According to this aspect of the present invention, the detectable particles are introduced and/or added into a molten plastic resin to produce a mixture comprising the molten plastic resin and the detectable particles, followed by extruding the mixture comprising the molten plastic resin and the detectable particles, so as to obtain a plastic film, preferably a thermoplastic film, particularly a (thermo)plastic food packaging film, comprising the detectable particles incorporated therein, particularly in homogeneous distribution.

With respect to further details as to the twelfth aspect of the present invention, reference may be made to the above explanations as to the other inventive aspects, which apply accordingly also to the twelfth aspect of the present invention.

Finally, according to a thirteenth aspect of the present invention, the present invention also refers to a multilayer film, especially a multilayer plastic film, particularly a (thermo)plastic multilayer food packaging film, especially a detectable (thermo)plastic multilayer film, which multilayer film comprises an inventive plastic film as defined hereinbefore.

In other words, the inventive plastic film comprising the detectable particles incorporated therein, as defined hereinbefore, forms part of the detectable multilayer film.

According to a particular embodiment, the plastic film comprising the detectable particles incorporated therein, as defined hereinbefore, may be combined with, especially co-extruded with and/or laminated with, preferably co-extruded with, at least one other plastic film of same or different material, preferably of a different material made of a plastic, particularly so as to form the detectable multilayer film of the invention.

Particularly, the inventive plastic film comprising the detectable particles incorporated therein, as defined hereinbefore, may be, on at least one of its both sides, combined with at least one other plastic film of same or different material, preferably of a different material made of a plastic, preferably via co-extrusion or lamination, particularly so as to form the detectable multilayer film.

According to a specific embodiment, the inventive plastic film comprising the detectable particles incorporated therein, as defined hereinbefore, may be combined with, especially co-extruded with and/or laminated with, preferably co-extruded with, at least one other plastic film of same or different plastic material, particularly so as to obtain a detectable plastic film comprising detectable particles incorporated therein and to which at least one other plastic film has been co-extruded on at least one of its both sides, preferably on both of its sides, particularly so as to form the detectable multilayer film.

Particularly, according to this inventive aspect, the inventive plastic film comprising the detectable particles incorporated therein, as defined hereinbefore, may be combined with, especially co-extruded with and/or laminated with, preferably co-extruded with, at least one other plastic film of different plastic material on its both sides, so as to obtain a detectable plastic film comprising detectable particles incorporated therein and to which at least one other plastic film has been attached and/or adhered and/or co-extruded and/or laminated, preferably co-extruded, on its both sides, particularly so as to obtain the detectable plastic film and/or the detectable multilayer film (structure). Especially, a multilayer film structure results, wherein the plastic film comprising the detectable particles incorporated therein forms the core layer of the multilayer film structure, to the two opposing sides of which core layer at least one other plastic film has been attached and/or adhered and/or co-extruded and/or laminated, preferably co-extruded, each, which form the outer layers of the multilayer film structure. Particularly, a multilayer film structure results, wherein the plastic film comprising the detectable particles incorporated therein comprises or consists of a polyethylene resin and the other plastic films comprise or consist of a polyamide resin each, especially wherein the other plastic films comprising or consisting of a polyamide resin each are co-extruded to and/or attached to the plastic film comprising or consisting of a polyethylene film via an adhesive layer or film each, preferably via rubber-modified polyethylene-based or a rubber-modified ethylene-vinylacetate (EVA)-based adhesive layer or film, particularly via a maleic anhydride modified polyethylene-based or a maleic anhydride modified ethylene-vinylacetate (EVA)-based adhesive layer or film. Especially, a multilayer film structure results, wherein the multilayer film comprises a polyethylene core layer comprising the detectable particles incorporated therein and at least one outer polyamide layer adhered to each side of the core layer.

According to a particular embodiment of the present invention, pursuant to this inventive aspect, the inventive plastic film comprising the detectable particles incorporated therein, as defined hereinbefore, is part of a multilayer film. Especially, the inventive plastic film comprising the detectable particles incorporated therein, as defined hereinbefore, comprises or consists of a polyethylene resin as the plastic material and forms the core layer of the multilayer film, wherein to both opposing sides of the core layer at least one other plastic film comprising or consisting of a polyamide resin is adhered, preferably coextruded, which other plastic films form the outer layers of the multilayer film. Especially, an adhesive layer or film may be positioned between the outer layers and the core layer, preferably a rubber-modified polyethylene-based or a rubber-modified ethylene-vinylacetate (EVA)-based adhesive layer or film particularly a maleic anhydride modified polyethylene-based or a maleic anhydride modified ethylene-vinylacetate (EVA)-based adhesive layer or film.

According to this inventive aspect, it is preferred if the detectable particles are used, especially introduced and/or added, in such amounts that the multilayer film comprising the detectable particles incorporated therein comprises 0.1 to 50 wt. %, especially 0.2 to 40 wt. %, particularly 0.3 to 30 wt. %, preferably 0.5 to 25 wt. %, more preferably 0.8 to 20 wt. %, even more preferably 1 to 15 wt. %, most preferably 1 to 10 wt. %, of the detectable particles, based on the overall weight of the multilayer film.

In other words, according to this inventive aspect, it is preferred if the inventive multilayer film comprising the detectable particles incorporated therein comprises 0.1 to 50 wt. %, especially 0.2 to 40 wt. %, particularly 0.3 to 30 wt. %, preferably 0.5 to 25 wt. %, more preferably 0.8 to 20 wt. %, even more preferably 1 to 15 wt. %, most preferably 1 to 10 wt. %, of the detectable particles, based on the overall multilayer film weight.

With respect to further details as to the thirteenth aspect of the present invention, reference may be made to the above explanations as to the other inventive aspects, which apply accordingly also to the thirteenth aspect of the present invention.

Hereinafter, the present invention will be elucidated in more detail using preferred embodiments and figures. In connection with the elucidation of these preferred embodiments, which are, however, in no way restrictive as to the present invention, further advantages, particularities, properties, aspects and features of the present invention are also shown.

Figure 2A:
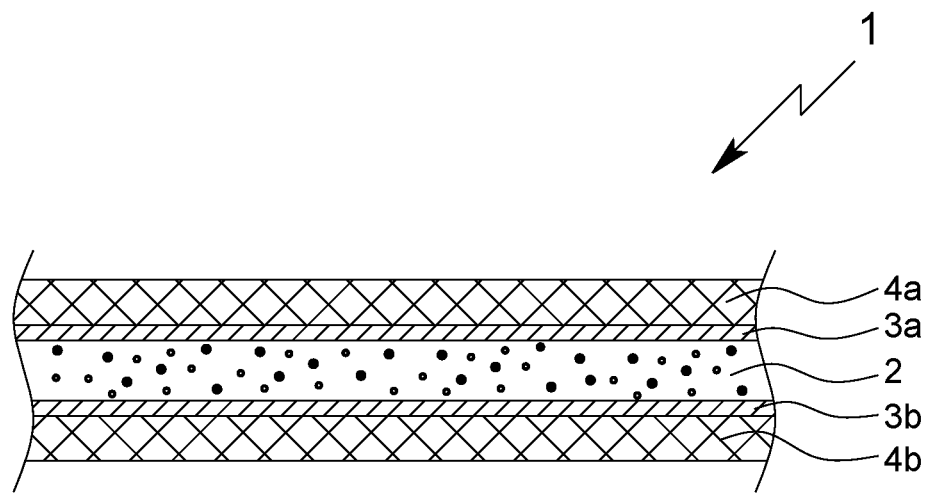
FIGS. 2A and 2B show each a schematic cross-sectional view of an inventive multilayer film comprising an inventive plastic film (i.e. preferably thermoplastic film) comprising detectable particles incorporated therein according to particular embodiments.
Figure 2B:
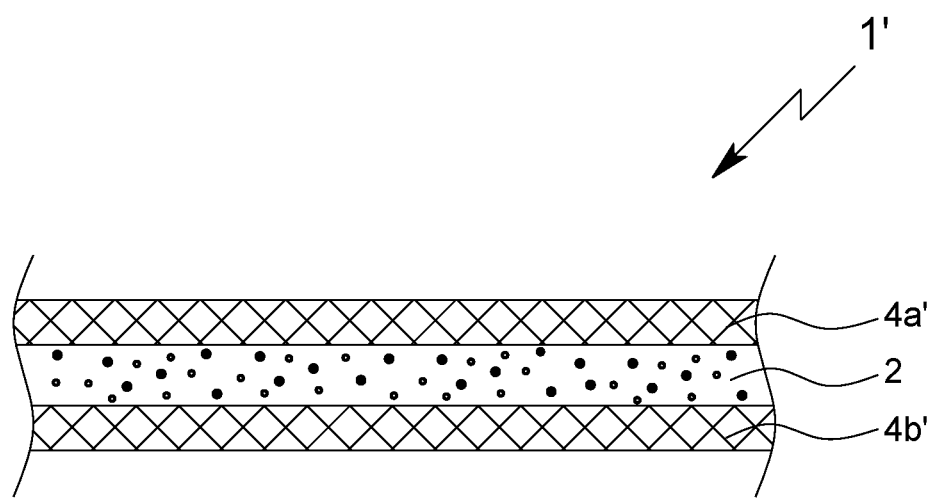

In the figures:

FIG. 1 shows a schematic cross-sectional view of an inventive plastic film (i.e. preferably thermoplastic film), particularly a (thermo)plastic food packaging film, comprising detectable particles incorporated therein according to a particular embodiment;

FIGS. 2A and 2B show each a schematic cross-sectional view of an inventive multilayer film comprising an inventive plastic film (i.e. preferably thermoplastic film) comprising detectable particles incorporated therein according to particular embodiments; and FIG. 3 shows each a schematic sequence of the inventive manufacturing method according to a particular embodiment.

FIG. 1 shows a schematic cross-sectional view of an inventive plastic film (i.e. preferably thermoplastic film) A, particularly a (thermo)plastic food packaging film, comprising detectable particles C incorporated in the plastic base film B. By the incorporation of the detectable particles C, the whole inventive plastic film A is detectable. As shown in FIG. 1, the detectable particles C are comprised by the inventive plastic film A in homogeneous distribution.

FIGS. 2A and 2B show each a schematic cross-sectional view of an inventive detectable multilayer film 1 and 1', respectively, comprising an inventive plastic film 2 (i.e. preferably thermoplastic film) comprising detectable particles incorporated therein (e.g. a polyethylene-based film 2 comprising detectable particles incorporated therein), wherein in the inventive plastic film 2 forms a core layer of the inventive multilayer film 1 and 1', respectively. On both sides of a core layer film 2, outer layers 4a, 4b (FIG. 2A) or 4a', 4b' (FIG. 2B), respectively, are adhered or attached or bonded to the core layer 2 (e.g. polyamide-based outer layers or films 4a, 4b (FIG. 2A) or 4a', 4b' (FIG. 2B), respectively), preferably via co-extrusion. In case of FIG. 2A, the outer layers 4a, 4b are adhered or attached or bonded to the core layer 2 via adhesive layers or films 3a, 3b (e.g. adhesive layers or films 3a, 3b on the basis of a rubber-modified polyethylene-based or a rubber-modified ethylene-vinylacetate (EVA)-based adhesive layer or film, particularly a maleic anhydride modified polyethylene-based or a maleic anhydride modified ethylene-vinylacetate (EVA)-based adhesive layer or film).

FIG. 3 shows a schematic sequence of the inventive manufacturing method according to a particular embodiment: In a first step or stage 1, a carrier plastic resin is provided which is molten, into which molten carrier plastic resin detectable particles are introduced and/or added, preferably in an extrusion device, followed by cooling and solidifying and preferably comminuting, so as to obtain, in a second step or 2, a particulate compounded mixture comprising the detectable particles together with and/or distributed in a carrier plastic resin, especially a particulate masterbatch comprising the detectable particles together with and/or distributed in a carrier plastic resin, preferably in high concentrations and/or amounts. In a subsequent step or stage 3, the thus produced particulate compounded mixture comprising the detectable particles, especially the particulate masterbatch, is then introduced and/or added into a molten plastic resin to produce a mixture comprising the molten plastic resin and the detectable particles, followed by extruding the mixture comprising the molten plastic resin and the detectable particles, so as to obtain, in final step or stage 4, an inventive plastic film comprising the detectable particles incorporated therein, particularly in homogeneous distribution.

As it has been shown hereinabove, the present invention, for the first time, provides an efficient and economic method of manufacturing a plastic film (i.e. preferably a thermoplastic film), particularly a (thermo)plastic food packaging film, especially a detectable (thermo)plastic film, which (thermo)plastic film comprises detectable particles incorporated therein as well as the (thermo)plastic film thus obtained.

The inventive method as well as the inventive film lead to a multitude of particularities and advantages, which have been described hereinabove in detail. This allows for a multitude of new applications and usages of the inventive film and of the present invention as a whole.

Further embodiments, configurations, adaptations, variations, modifications, peculiarities, particularities and advantages of the present invention are immediately apparent to and implementable by the person skilled in the art on reading or studying the present application, without leaving the realm of the present invention.

The present invention will be illustrated, in the following, by the various examples which will be described hereinbelow but which are not at all intended to restrict the present invention in any way.

EXAMPLES

General Description of the Manufacturing Method for the Examples

All inventive films are produced according to a manufacturing method as schematically shown in FIG. 3 and as described hereinabove.

As detectable particles in the sense of the present invention, commercially available magnetic iron oxide powder on the basis of magnetite ($Fe_3O_4$) is used (density: 5.2 g/cm$^3$; bulk density: 1.9 g/cm$^3$; particle size D10: 5 μm, particle size D50: 16 μm, particle size D100: 80 μm). Both detectable particles without surface-modification and with surface-modification (i.e. hydrophobic surface-modification on the basis of polysiloxanes) are tested.

All films produced have a multilayer structure of the following type and layer structure and are produced in a melt co-extrusion process using an annular ring die:

PA (outer)//adhesive//PE core with detectable particles//adhesive//PA (outer) wherein PE designates polyethylene resin and PA designates polyamide resin.

In a first production series, the detectable particles (with and without surface-modifications) are directly added to the molten PE resin. Detectable multilayer films with different amounts of detectable particles are produced (inventive multilayer films nos. 1a, 1b, 1c, 1d with amounts of unmodified detectable particles of 2.1 wt. %, 4.8 wt. %, 7.9 wt. % and 10.2 wt. %; inventive multilayer films nos. 1e, 1f, 1g, 1h with amounts of surface-modified detectable particles of 2.2 wt. %, 4.7 wt. %, 8.1 wt. % and 10.5 wt. %).

In a second production series, the detectable particles (with and without surface-modifications) are first processed to a particulate masterbatch in the form of pellets with amounts of 50.1 wt. % of the detectable particles (with and without surface-modification) in a PE carrier resin; masterbatch production is performed according the above described split-feed process using a twin-screw extrusion device. The particulate masterbatch is added to molten PE resin in a co-extrusion process. Further detectable multilayer films with different amounts of detectable particles are produced (inventive multilayer films nos. 2a, 2b, 2c, 2d with amounts of unmodified detectable particles of 2.5 wt. %, 5.3 wt. %, 8.5 wt. % and 12.2 wt. %; inventive multilayer films nos. 2e, 2f, 2g, 2h with amounts of surface-modified detectable particles of 2.2 wt. %, 4.9 wt. %, 8.0 wt. % and 10.9 wt. %).

In a third production series, the detectable particles (with and without surface-modifications) the above described particulate masterbatch pellets in the form of PE pellets with amounts of 50.1 wt. % of the detectable particles (with and without surface-modification) are directly co-extruded. Further detectable multilayer films with different amounts of detectable particles are produced (inventive multilayer film nos. 3a with amounts of unmodified detectable particles of 20.2 wt. %; inventive multilayer film no. 3b with amounts of surface-modified detectable particles of 21.2 wt. %).

The detectable multilayer films of the invention comprising the detectable particles incorporated therein, which are obtained as the final product, are subsequently tested for detectability. All films are produced in the form of tubular casings.

Description of the Testing Results

All tubular casings are tested in food processing, especially stuffing with meat, and smoking and/or cooking treatment, followed by unpeeling the casings.

All detectable casings show the usual properties of plastic casings without being affected by the presence of the detectable particles. However, in addition (i.e. unlike usual plastic casings), all casings are detectable to a magnetic field, i.e. all tubular casings have magnetic properties.

In an automated industrial production line for hot dogs, comprising a metal detector of the type Mettler-Toledo Safeline, pieces of varying size of the inventive films are positioned both onto the foodstuff surfaces and also even inside the foodstuff.

Film pieces of about 2.3 cm×2.7 cm in size could be easily detected both on the foodstuff surface and also even inside the foodstuff surface. The same applies even to film pieces of the inventive films of 1 cm×1.2 cm size. Even smaller pieces of the inventive films of 0.5 cm×0.7 cm size can still be detected during automated industrial run of the hot dog production.

Best testing results are obtained with the surface-modified detectable particles since they give the strongest signal. Nevertheless, also films produced using the non-surface-modified detectable particles are still easily detectable.

In further test series, test pieces of the inventive films may also be detected via an optically based device or a photo-detection device. For, the detectable particles used according to the present invention create also an unknown and unusual opacity of the films into which they are incorporated, i.e. different from that obtainable e.g. with usual carbon black pigments at the same level of addition. Especially, the detectable particles used according to the present invention are exceedingly black (and not the gray color obtained with carbon black at the same loading), so this effect is photosensitive enough for optical detection or photodetection, respectively.

The invention claimed is:

1. A detectable thermoplastic food packaging film comprising detectable particles incorporated therein in homogeneous distribution,
    wherein the detectable particles are permanently magnetic and comprise a hydrophobic surface-modification being at least one of protective against oxygen and protective against oxidation,
        wherein the surface-modification of the detectable particles is bonded to the surfaces of the detectable particles,
        wherein the detectable particles comprise a weight-related specific saturation magnetization of at least 50 $Am^2/kg$ iron (Fe),
        wherein the detectable particles comprise absolute particle sizes in the range of from 0.01 to 1,000 micrometers, and
        wherein the surface-modification of the detectable particles comprises inorganic, organic or inorganic-organic polymers selected from the group consisting of polysiloxanes, polyacrylates, polymethacrylates, polyacrylamides, starch-based polymers, cellulose-based polymers, polysaccharides, polyaminosaccharides and biopolymers as well as mixtures and combinations thereof;
    wherein the detectable thermoplastic food packaging film is a multilayer film comprising:
        as a core layer, a plastic film comprising all the detectable particles; and
        to opposing sides of the core layer, at least one other plastic film co-extruded with the core layer, each of the at least one other plastic film providing one of outer layers of the multilayer film, each of the at least one other plastic film comprising a plastic material different than that of the core layer;
    wherein the plastic film of the core layer comprises a polyethylene resin; and
    wherein the plastic material of the at least one other plastic film providing the outer layers comprises a polyamide resin.

2. A detectable thermoplastic food packaging film comprising detectable particles incorporated therein in homogeneous distribution,
    wherein the detectable particles are permanently magnetic and comprise a hydrophobic surface-modification being at least one of protective against oxygen and protective against oxidation,
        wherein the surface-modification of the detectable particles is bonded to the surfaces of the detectable particles, wherein the detectable particles comprise a weight-related specific saturation magnetization of at least 50 Am²/kg iron (Fe), and wherein the surface-modification of the detectable particles comprises inorganic, organic or inorganic-organic polymers selected from the group consisting of polysiloxanes, polyacrylates, polymethacrylates, polyacrylamides, starch-based polymers, cellulose-based polymers, polysaccharides, polyaminosaccharides and biopolymers as well as mixtures and combinations thereof; and wherein the detectable thermoplastic food packaging film is a multilayer film comprising:
  as a core layer, a plastic film comprising all the detectable particles; and
  to opposing sides of the core layer, at least one other plastic film co-extruded with the core layer, each of the at least one other plastic film providing one of outer layers of the multilayer film, each of the at least one other plastic film comprising a plastic material different than that of the core layer;
  wherein the plastic film of the core layer comprises a polyethylene resin; and
wherein the at least one other plastic film providing the outer layers each comprises a polyamide resin.

3. The thermoplastic film as defined in claim 2:
wherein the detectable particles are ferromagnetic, ferrimagnetic, paramagnetic or superparamagnetic.

4. The thermoplastic film as defined in claim 2:
wherein the detectable particles comprise at least one metal or metal oxide selected from the group consisting of iron (Fe), cobalt (Co), nickel (Ni) and their oxides.

5. The thermoplastic film as defined in claim 2:
wherein the detectable particles comprise at least one magnetic iron oxide selected from the group consisting of magnetite ($Fe_3O_4$), maghemite ($Fe_2O_3$), hematite ($Fe_2O_3$), ferrite, goethite (FeO(OH)), lepidocrocite (FeO(OH)) and ferroxyhyte (FeO(OH)).

6. The thermoplastic film as defined in claim 2:
wherein the detectable particles comprise iron (Fe) in weight-related amounts in the range of from 20 to 80 wt. %, based on the overall particle weight.

7. The thermoplastic film as defined in claim 2:
wherein the detectable particles comprise absolute particle sizes in the range of from 0.01 to 1,000 micrometers.

8. The thermoplastic film as defined in claim 2:
wherein the detectable particles and the thermoplastic film comprising the detectable particles incorporated therein are detectable by at least one of a metal detection device, an induction-based detection device, a magnetism-based device, a conductivity-based detection device, an optically based detection device and a photodetection device.

9. The thermoplastic film as defined in claim 2:
wherein the thermoplastic film comprises 0.1 to 75 wt. % of the detectable particles, based on the overall thermoplastic film weight.

10. The thermoplastic film as defined in claim 2:
wherein the thermoplastic film comprises 0.2 to 60 wt. % of the detectable particles, based on the overall thermoplastic film weight.

11. The thermoplastic film as defined in claim 2:
wherein the thermoplastic film further comprises at least one food-compatible plasticizer.

12. The thermoplastic film as defined in claim 11:
wherein the thermoplastic film comprises the at least one food-compatible plasticizer in amounts of from 0.5 to 40 wt. %, based on the overall weight of the thermoplastic film.

13. The thermoplastic film as defined in claim 2:
wherein the thermoplastic film forms a tubular film or a seamless tubular film.

14. The thermoplastic film as defined in claim 2:
wherein the thermoplastic film forms a casing, a tubular casing or a seamless tubular casing.

15. The thermoplastic film as defined in claim 2:
wherein the thermoplastic film forms a shirred seamless tubular casing.

16. The thermoplastic film as defined in claim 2:
wherein the thermoplastic film has an overall thickness in the range of from 1 to 2,000 micrometers.

17. The thermoplastic film as defined in claim 2:
wherein the thermoplastic film has been obtained by a method comprising the following steps:
  a first step of introducing the detectable particles into a molten plastic resin to produce a mixture comprising the molten plastic resin and the detectable particles, and
    wherein the detectable particles are introduced into the molten plastic resin in the form of a particulate compounded mixture comprising the detectable particles together with and distributed in a carrier plastic resin, wherein the particulate compounded mixture comprises the detectable particles in amounts in the range of from 10 to 80 wt. %, based on the particulate compounded mixture; and
  (ii) followed by a second step of extruding the mixture comprising the molten plastic resin and the detectable particles, wherein the step of extruding the mixture comprising the molten plastic resin and the detectable particles is performed as a co-extrusion process wherein the plastic film comprising the detectable particles incorporated therein is co-extruded with the at least one other plastic film of different plastic material on both sides of the plastic film so as to obtain:
    as the core layer, the plastic film comprising the detectable particles incorporated therein in homogeneous distribution; and
    as the outer layers on the both sides of the plastic film of the core layer, the at least one other plastic film.

18. A foodstuff article packaged in a thermoplastic film as defined in claim 2.

19. The thermoplastic film as defined in claim 2, further comprising an adhesive layer between the plastic film of the core layer and each of the at least one other plastic film providing the outer layers.

20. A method of manufacturing the detectable thermoplastic food packaging film of claim 2,
wherein the method comprises the following steps:
  (i) a first step of introducing detectable particles into a molten plastic resin to produce a mixture comprising the molten plastic resin and the detectable particles,
    wherein the detectable particles are permanently magnetic and comprise a hydrophobic surface-modification being at least one of protective against oxygen and protective against oxidation,
    wherein the surface-modification of the detectable particles is bonded to the surfaces of the detectable particles, wherein the detectable particles comprise a weight-related specific saturation magnetization of at least 50 Am²/kg iron (Fe), wherein the surface-modification of the detectable particles comprises inorganic, organic or inorganic-organic polymers selected from the group consisting of polysiloxanes, polyacrylates, polymethacrylates, polyacrylamides, starch-based polymers, cellulose-based polymers, polysaccharides, polyaminosaccharides and biopolymers as well as mixtures and combinations thereof, and wherein the detectable particles are introduced into the molten plastic resin in the form of a particulate compounded mixture comprising the detectable particles together with and distributed in a carrier plastic resin, wherein the particulate compounded mixture comprises the detectable particles in amounts in the range of from 10 to 80 wt. %, based on the particulate compounded mixture;

(ii) followed by a second step of extruding the mixture comprising the molten plastic resin and the detectable particles, so as to obtain a thermoplastic food packaging film comprising the detectable particles incorporated therein in homogeneous distribution.

21. The method as defined in claim 20:

wherein the detectable particles comprise at least one metal or metal oxide selected from the group consisting of iron (Fe), cobalt (Co), nickel (Ni) and their oxides.

22. The method as defined in claim 20:

wherein the detectable particles comprise at least one magnetic iron oxide selected from the group consisting of magnetite ($Fe_3O_4$), maghemite ($Fe_2O_3$), hematite ($Fe_2O_3$), ferrite, goethite (FeO(OH)), lepidocrocite (FeO(OH)) and ferroxyhyte (FeO(OH)); and wherein the detectable particles comprise iron (Fe) in weight-related amounts in the range of from 20 to 80 wt. %, based on the overall particle weight.

23. The method as defined in claim 20:

wherein the method further comprises adding at least one plasticizer to the thermoplastic film, wherein the plasticizer is used in such amounts that the resulting thermoplastic film comprises 0.5 to 40 wt. %, based on the overall weight of the thermoplastic film comprising the detectable particles incorporated therein, and wherein the plasticizer is a food-compatible plasticizer.

* * * * *

UNITED STATES PATENT AND TRADEMARK OFFICE
CERTIFICATE OF CORRECTION

PATENT NO. : 11,969,928 B2
APPLICATION NO. : 16/339259
DATED : April 30, 2024
INVENTOR(S) : Myron D. Nicholson et al.

Page 1 of 1

It is certified that error appears in the above-identified patent and that said Letters Patent is hereby corrected as shown below:

In the Specification

| | | |
|---|---|---|
| Column 2, | Line 40, | change "DE 20 2004 007 735 UI (comparable" to --DE 20 2004 007 735 U1 (comparable-- |
| Column 2, | Line 44, | change "the yam used" to --the yarn used-- |
| Column 3, | Line 61, | change "(i.e, preferably" to --(i.e. preferably-- |
| Column 4, | Lines 11-12, | change "and/or producing. Further," to --and/or producing foodstuff. Further,-- |
| Column 4, | Lines 42-43, | change "invention are the described" to --invention are described-- |
| Column 4, | Line 64, | change "invention herein." to --invention are described herein.-- |
| Column 5, | Line 42, | change "components/ingredients always" to --components/ingredients—always-- |
| Column 8, | Line 38, | change "detectably: particles" to --detectable particles-- |
| Column 11, | Line 46, | change "(iii) poly-acrylates and" to --(iii) polyacrylates and-- |
| Column 17, | Lines 20-21, | change "preferably to 110" to --preferably 3 to 110-- |
| Column 17, | Line 32, | change "of from to 8 g/cm$^3$," to --of from 1 to 8 g/cm$^3$,-- |
| Column 17, | Line 35, | change "DIN EN 150 60-1:" to --DIN EN ISO 60-1:-- |
| Column 18, | Line 42, | change "smoke etc.)" to --smoke etc.).-- |
| Column 19, | Line 45, | change "detectable multi layer film" to --detectable multilayer film-- |
| Column 19, | Line 67, | change "a multi layer film." to --a multilayer film.-- |
| Column 20, | Lines 6-7, | change "a polyimide resin" to --a polyamide resin-- |
| Column 20, | Line 55, | change "and/or adoring food" to --and/or odoring food-- |
| Column 21, | Line 44, | change "a shined seamless" to --a shirred seamless-- |
| Column 21, | Lines 50-51, | change "or multi layer food" to --or multilayer food-- |
| Column 21, | Line 63, | change "Also the thickness" to --Also, the thickness-- |
| Column 22, | Line 35, | change "at least 40%), at a" to --at least 40%, at a-- |
| Column 22, | Lines 62-63, | change "from 20 to 300 especially" to --from 20 to 300%, especially-- |
| Column 23, | Line 10, | change "90 cm$^3$/m$^2$/4 hours," to --90 cm$^3$/m$^2$/24 hours,-- |
| Column 26, | Line 59, | change "or film particularly" to --or film, particularly-- |

Signed and Sealed this
Sixteenth Day of July, 2024

Katherine Kelly Vidal
*Director of the United States Patent and Trademark Office*